(12) United States Patent
Markendorf et al.

(10) Patent No.: US 10,048,379 B2
(45) Date of Patent: Aug. 14, 2018

(54) LASER TRACKER HAVING TARGET-SEEKING FUNCTIONALITY

(71) Applicant: LEICA GEOSYSTEMS AG, Heerbrugg (CH)

(72) Inventors: Albert Markendorf, Walde (CH); Burkhard Böckem, Rieden (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 284 days.

(21) Appl. No.: 14/905,755

(22) PCT Filed: Jul. 16, 2014

(86) PCT No.: PCT/EP2014/065309
§ 371 (c)(1),
(2) Date: Jan. 15, 2016

(87) PCT Pub. No.: WO2015/007799
PCT Pub. Date: Jan. 22, 2015

(65) Prior Publication Data
US 2016/0252619 A1    Sep. 1, 2016

(30) Foreign Application Priority Data

Jul. 16, 2013   (EP) .................................... 13176647

(51) Int. Cl.
*G01C 3/00* (2006.01)
*G01S 17/66* (2006.01)
(Continued)

(52) U.S. Cl.
CPC ................ *G01S 17/66* (2013.01); *G01C 1/04* (2013.01); *G01C 3/08* (2013.01); *G01S 17/023* (2013.01);
(Continued)

(58) Field of Classification Search
CPC ........ G01S 17/023; G01S 17/08; G01S 17/89; G01S 17/66; G01S 17/48; G01C 1/04; G01C 3/08
(Continued)

(56) References Cited

U.S. PATENT DOCUMENTS 5,198,877 A   3/1993 Schulz
6,781,705 B2  8/2004 Waslowski et al.
(Continued)

FOREIGN PATENT DOCUMENTS

DE  10 2008 039838 A1  3/2010
DE  10 2010 024014 A1  12/2011
(Continued)

OTHER PUBLICATIONS

European Search Report dated Nov. 7, 2014 as received in Application No. 13 17 6647.

*Primary Examiner* — Mark Hellner
(74) *Attorney, Agent, or Firm* — Maschoff Brennan

(57) ABSTRACT

Some embodiments of the invention relate to a laser tracker for continuously tracking a reflective target and for determining the position of the target, comprising a base that defines a vertical axis and a beam-deflecting unit for emitting measurement radiation. The beam-deflecting unit can be pivoted about the vertical axis and a tilt axis in relation to the base in a motorized manner and a measurement axis is defined by an emission direction of the measurement radiation. The laser tracker may have a fine distance measurement unit for precisely determining a distance to the target, an angle measurement functionality for determining an orientation of the beam-deflecting unit in relation to the base, and a target-seeking unit. The target-seeking unit has illuminating means, a camera having a position-sensitive detector for detecting illumination radiation reflected by the target, and (Continued)

a control and evaluating unit having seeking functionality for finding the target.

22 Claims, 14 Drawing Sheets

(51) Int. Cl.
  *G01C 1/04* (2006.01)
  *G01C 3/08* (2006.01)
  *G01S 17/48* (2006.01)
  *G01S 17/02* (2006.01)
  *G01S 17/08* (2006.01)
  *G01S 17/89* (2006.01)

(52) U.S. Cl.
  CPC ............. *G01S 17/08* (2013.01); *G01S 17/48* (2013.01); *G01S 17/89* (2013.01)

(58) Field of Classification Search
  USPC ........................................................ 356/3.01
  See application file for complete search history.

(56) References Cited

U.S. PATENT DOCUMENTS

| | | | |
|---|---|---|---|
| 8,031,331 B2 | 10/2011 | Meier et al. | |
| 8,567,076 B2 | 10/2013 | Ortleb et al. | |
| 8,772,719 B2 | 7/2014 | Böckem et al. | |
| 2008/0018880 A1* | 1/2008 | Matsuo | G01C 1/04 356/4.01 |
| 2011/0285592 A1 | 11/2011 | Green et al. | |
| 2014/0320643 A1 | 10/2014 | Markendorf | |
| 2016/0169659 A1* | 6/2016 | Steffey | G01S 7/4817 356/614 |

FOREIGN PATENT DOCUMENTS

| | | |
|---|---|---|
| EP | 0 553 266 A1 | 8/1993 |
| EP | 1 211 478 A2 | 6/2002 |
| EP | 1 533 629 A2 | 5/2005 |
| EP | 2 194 399 A1 | 6/2010 |
| EP | 2 602 641 A1 | 6/2013 |
| WO | 2007/079600 A1 | 7/2007 |
| WO | 2010/148525 A1 | 12/2010 |
| WO | 2013/059720 A1 | 4/2013 |

* cited by examiner

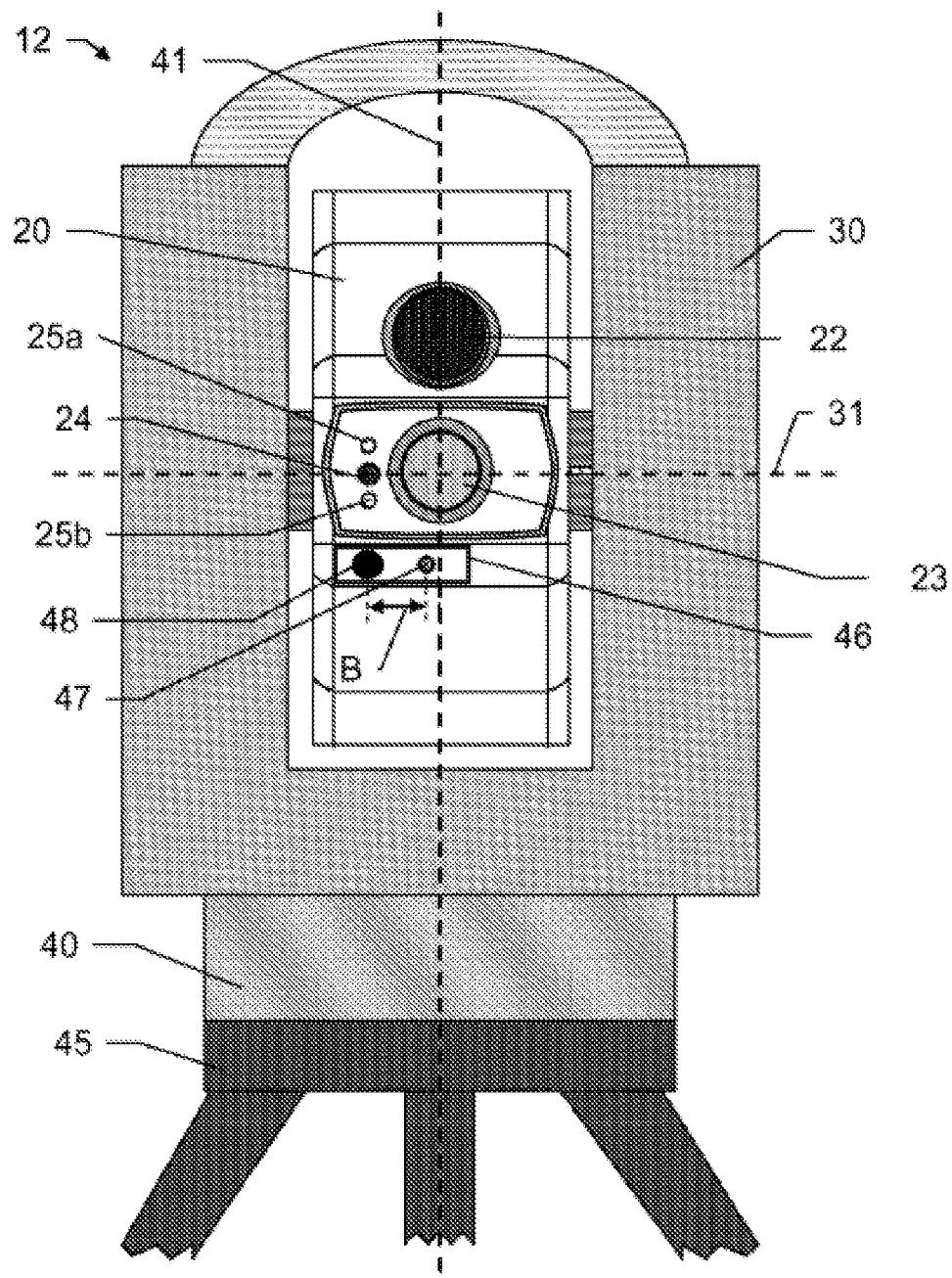

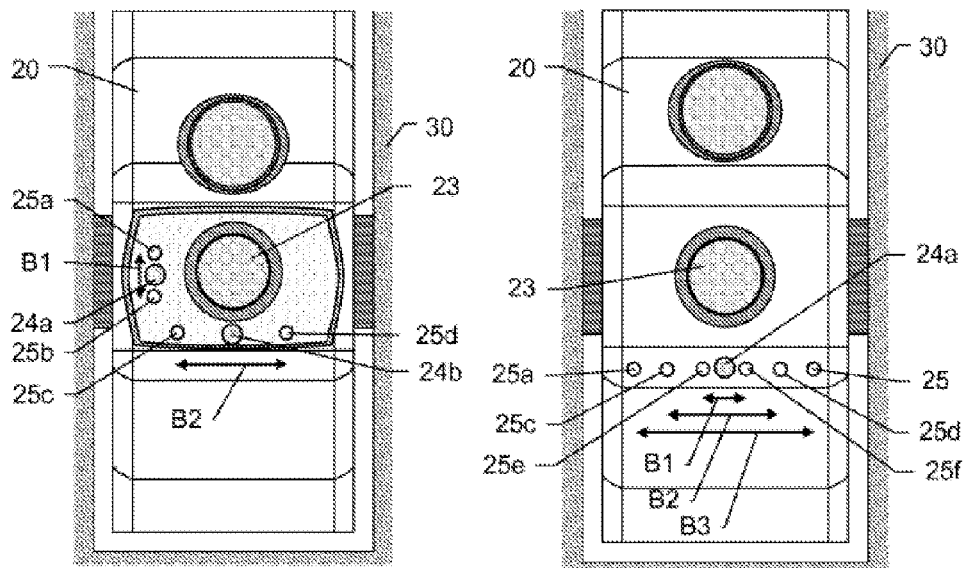
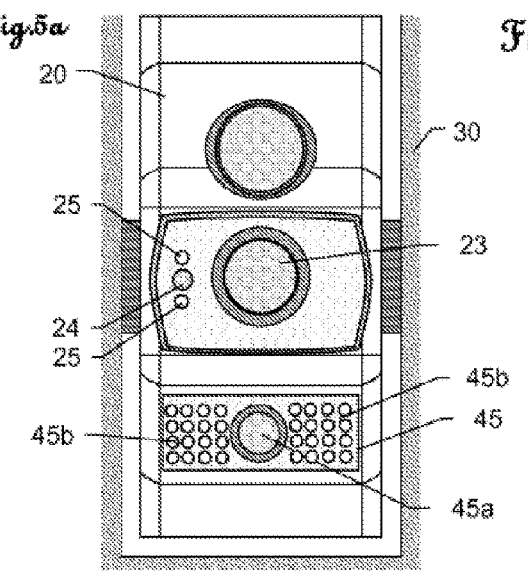

LASER TRACKER HAVING TARGET-SEEKING FUNCTIONALITY

FIELD OF THE INVENTION

Some embodiments of the invention refer to coordinate measuring equipment, particularly to a laser tracker, for continuously tracking a reflective target and for determining the distance to the target, and methods for finding the target.

BACKGROUND

Measuring devices designed for continuously tracking a target point and a coordinative determination of the position of this point can be summarized under the term laser tracker, particularly in the context of industrial measurement. In this, a target point may be represented by a retro-reflecting unit (e.g. cubic prism) that is targeted with an optical measurement beam of the measuring equipment, particularly a laser beam. The laser beam is reflected parallel to the measuring equipment, with the reflected beam being acquired with the acquisition unit of the device. In this, an emission and a receiving direction of the beam respectively, for instance with the help of sensors for angle measurement assigned to a beam splitting mirror or a targeting unit of the system, is determined. Moreover, a distance from the measuring equipment to the target point is determined when acquiring the beam, e.g. by means of the time-of-flight or phase difference measurement or by using the Fizeau principle.

State-of-the-art laser trackers may additionally be designed with an optical picture acquisition unit with a two-dimensional, light-sensitive array, e.g. a CCD or CID camera or a CMOS array-based camera, or a pixel array sensor and with a picture processing unit. In this, the laser tracker and the camera may particularly be mounted one on top of the other in such a way that their positions relative to each other cannot be changed. For instance, the camera can be pivoted together with the laser tracker around the laser tracker's essentially vertical axis, but can be pivoted upwards and downwards regardless of the laser tracker and hence is positioned separately from the lens of the laser beam in particular. Furthermore, the camera—e.g. depending on the respective application—may be designed in such a way that it can only be pivoted around a single axis. In alternative implementations, the camera may be mounted together with the laser lens in a common housing in an integrated design.

The processes of acquiring and interpreting a picture—by means of picture acquisition and picture processing unit—of so-called auxiliary measuring equipment with marks, the relative length of which regarding each other is known, are indicative of a spatial orientation of an object (e.g. a probe) positioned at the auxiliary measuring equipment. Together with the determined spatial position of the target point, it is furthermore possible to precisely determine the spatial position and the orientation of the object absolutely and/or relative to the laser tracker.

Such auxiliary measuring equipment may be embodied by so-called touch tools positioned on one point of the target object with their contact point. The touch tool is characterized by marks, e.g. points of light, and a reflector representing a target point at the touch tool and that can be targeted with the laser beam of the tracker, with the positions of the marks and the reflectors relative to the contact point of the touch tool being known precisely. In a manner known to the person skilled in the art, the auxiliary measuring equipment may also be, for instance, a hand-held scanner equipped for distance measurement for non-contact surface measurements, with the direction and position of the scanner measurement beam used for distance measurement relative to the light points and reflectors positioned on the scanner being known precisely. Such a scanner is described in EP 0 553 266, for instance.

For distance measurement purposes, state-of-the-art laser trackers are equipped with at least one distance measurement unit, with this possibly being present as an interferometer, for instance. Since such distance measurement units are only capable of measuring relative changes regarding the distance, so-called absolute distance measurement units are installed in today's laser trackers, in addition to interferometers. The interferometers used for distance measurement in this context mainly use HeNe gas lasers as sources of light—due to the large coherence length and the measurement range facilitated by this length. In this, the coherence length of the HeNe laser may be several hundred meters so that the ranges required in the field of industrial measurement technology can be achieved using relatively simple interferometer arrangements. For instance, a combination of an absolute distance measurement unit and an interferometer for determining the distance using an HeNe laser is known from WO 2007/079600 A1.

Furthermore, a fine targeting sensor is used in advanced tracker systems—increasingly standardized—to determine a deviation of the received measurement beam from a zero position. Using this measurable deviation, it is possible to determine a position difference between the center of a retro-reflector and the point of impact of the laser beam on the reflector and to correct and reposition, respectively, the orientation of the laser beam depending on this deviation in such a way that the deviation on the fine targeting sensor is reduced, particularly is "zeroed", so that the beam is oriented towards the center of the reflector. By repositioning the orientation of the laser beam, continuous tracking of the target point can be implemented and the distance and position of the target point can be determined continuously relative to the measuring equipment. In this, repositioning may be implemented by changing the orientation of the beam-splitting mirrors moved in a motorized manner and designed for deflecting the laser beam and by pivoting the targeting unit that is equipped with the beam-guiding laser lens, respectively.

The target tracking process described must be preceded by the process of coupling the laser beam to the reflector. For this, an acquisition unit for target finding with a position-sensitive sensor and with a relatively large field of view may additionally be positioned at the tracker, with the optical sensor axis defined by the sensor and the axis, along which the measurement laser beam extends, are offset to one another. Furthermore, generic equipment includes additional means of illumination that are used to illuminate the target and the reflector, respectively, particularly with a defined wavelength differing from the wavelength of the distance measuring equipment. In this context, the sensor may be designed in such a way that it is sensitive to a range around this determined wavelength, for instance in order to reduce or completely prevent extraneous light effects. By means of the means of illumination, the target can be illuminated and the camera can be used to acquire a picture of the target with illuminated reflector. By showing the specific (wavelength-specific) reflex on the sensor, the reflex position in the picture can be resolved and hence an angle relative to the acquisition direction of the camera and a direction to the target and reflector, respectively, can be determined. One embodiment of a laser tracker with such a target tracking unit is known from WO 2010/148525 A1, for instance.

Depending on the direction information that can be derived in the manner above, the orientation of the measurement laser beam can be changed in such a way that a distance between the laser beam and the reflector, the laser beam is to be coupled to, is reduced. Due to the offset regarding the optical sensor axis defined by the sensor and the measurement axis of the measuring equipment, the beam can be directed towards the target with the help of the sensor-based determination of the direction to the target, and therefore coupling cannot be performed within one direct step. For a stationary target, this requires several iteration steps with one measurement process in each case (re-determination of a direction to the target using the sensor) in order to approximate the laser beam. As a consequence, the disadvantage of such an approximation method is that tracking and targeting the target are time-consuming processes (since they are iterative) and that tracking, particularly in the event of a movement of the target relative to the sensor, is not robust and unambiguous. Furthermore, no approximation of the laser beam regarding the target can be achieved in the event of a movement of the target relative to the laser tracker, since a deviation between the target detected using the sensor and the laser beam changes continuously in so doing. As a consequence, no iterative approximation of the beam regarding the target may be achieved due to this change regarding the deviation occurring during the movement of the target. In this, every iteration step comprising the re-acquisition of a reflex corresponds to such a first measurement regarding a (new) target. In general, this results in a huge disadvantage of such systems for target tracking consisting in the fact that stationary targets can only be targeted in a relatively time-consuming manner and that it is not possible at all to directly target moving targets.

SUMMARY

Therefore, the task of the present invention is to provide an advanced laser tracker with a seeking functionality for precisely and faster finding and particularly targeting a target.

This task is resolved by implementing the characteristic features of the independent claims. Features upgrading the invention in an alternative or advantageous manner can be found in the dependent patent claims.

The invention refers to a laser tracker for continuously tracking a reflective target and for determining the position of the target. In this, the tracker is characterized by a base defining a vertical axis and a beam deflecting unit for emitting a measurement radiation and for receiving at least a part of the measurement radiation reflected by the target, with the beam deflecting unit pivoting around the vertical axis and a tilt axis relative to the base in a motorized manner and a measurement axis being defined by an emission direction of the measurement radiation. Furthermore, the laser tracker is equipped with a position-sensitive fine targeting detector defining a fine targeting field of view for fine targeting and tracking the target by detecting measurement radiation reflected by the target, and with a fine distance measurement unit for precise determination of the distance to the target by means of the measurement radiation and with an angle measuring functionality for determining an orientation of the beam deflecting unit relative to the base. Moreover, the laser tracker is equipped with a target-seeking unit that is equipped with means of illumination for illuminating the target with electromagnetic illumination radiation and a camera defining a field of view, with the optical axis of the camera being offset from the measurement axis, as is known. The camera is equipped with a position-sensitive detector, whereby reflected illumination radiation can be acquired as one or several light spots in a picture of the reflective target and a position can be determined in the picture for the acquired illumination radiation. This picture position of the illumination radiation reflected by the target on the detector depends on the position of the target relative to the laser tracker, which is why this position can be used to derive target position information. Furthermore, the laser tracker according to the invention is equipped with a control and evaluating unit that is configured in such a way that, when executing a seeking functionality, the target is found depending on the picture position and the target position information derived thereof, respectively.

According to the invention, the control and evaluating unit is used, by finding the target, to determine a deviation of the orientation of the measurement axis from the direction to the target in particular, which is expressed preferably in different azimuth angles so that a difference of the horizontal and vertical azimuth angles is determined as the deviation in each case, for instance. In this, the term direction to the target shall be understood as the orientation of the beam deflecting unit the unit must adopt in order for the measurement radiation to hit the target. In contrast to the aforementioned, the term target direction shall be understood as a piece of target position information including direction information, particularly connected to an element of the target-seeking unit and that must not be compared to the direction to the target due to the offset of the measurement axis to the camera or to other elements of the target-seeking unit.

Based on the search result, i.e. finding the target, the position of the target relative to the laser tracker is known as a matter of principle. This position may be referred to as the roughly approximated position, since it is less exact than the position that can be determined based on the measurement using measurement radiation. Accordingly, a distance to the target determined by the target-seeking unit is referred to as the roughly approximated distance. The roughly approximated localization data determined is sufficient in order to be able to orient the measurement beam towards the target. Based on finding the target, the control and evaluating unit is used, taking into consideration the known relative arrangement of the target-seeking unit or individual components of the target-seeking unit and the beam deflecting unit relative to one another, to orient the beam deflecting unit and therefore the measurement beam towards the target. In particular, the differences of the azimuth angles between actual and target measurement axis orientation are determined and the orientation is changed until, at least to a large extent, the differences equal zero and/or the measurement beam is reflected by the target and registered by the fine targeting detector.

The measurement radiation is oriented in two axes (vertical axis and tilt axis and tilting axis, respectively) by using the motors on the laser tracker designed for pivoting the beam deflecting unit, particularly actuators, with these being capable of being actuated via the control and targeting unit.

According to the invention, the laser tracker may be characterized by a support pivoting around the vertical axis relative to the base in a motorized manner and defining the tilt axis and a horizontal or lying axis, respectively, and a targeting unit designed as a beam deflecting unit pivoting around the tilt axis relative to the support in a motorized manner with a telescopic unit for emitting the measurement radiation and for receiving at least a part of the measurement radiation reflected by the target.

Finding the target with the help of the seeking functionality allows for directly orienting the measurement radiation towards the target, for the measurement radiation being reflected by the target, and for precisely determining the distance to the target. To this end, both an absolute distance measurement unit and an interferometer may be installed into the laser tracker in order to measure the distance, at which one source of radiation can be designed for both measuring units in each case and the emitted radiation may extend along a joint measuring path and ultimately on a joint measurement axis.

According to the invention, the camera and the measurement axis may be arranged relative to one another in such a way that the measurement axis is positioned at least partially within the field of view of the camera. In particular regarding the process of targeting moving targets, such an overlap of the measurement axis with the visible area is advantageous within the framework of the targeting process. According to the invention, the camera may be arranged in such a way in this that its optical axis is characterized by a parallel offset or positioned at a defined angle relative to the measurement axis. In general, the camera mentioned in connection with the present invention is equipped with a position-sensitive detector in such a way that the fields of view relative to the measurement radiation and to the aperture angle of the measurement radiation, respectively, are large, i.e. the field of view is larger than the aperture angle of the beam, in order to acquire a relatively large area of a measurement environment with potential targets.

As opposed to the camera, another type of position-sensitive detector (PSD), which is installed in the telescopic unit of a laser tracker and serves for fine targeting and tracking the target, for instance, is characterized by a narrow field of view, e.g. 0.67° or less, or for a PSD with parallel field of view ±4 mm or less. This PSD is positioned in such a way that it is able to recognize the measurement radiation reflected by the target and renders determinable a deviation of the acquired radiation from a target value based on this detection (i.e. the PSD is coupled to the measurement beam path). Depending on this deviation, a deviation of the measurement laser beam from the center of a retro-reflector may be determined and this radiation may be re-oriented in such a way that the beam hits the center of the reflector. In particular, solely the retro-reflected laser beam is detected and its position is analyzed.

According to the invention, the means of illumination of the target-seeking unit may particularly emit illumination radiation differing from the measurement radiation, particularly regarding wavelength and focus. Preferably, the means of illumination emit light in the infrared range, especially within a narrow IR wavelength range. In this, the light may be emitted divergently so that a large ambient area of the laser tracker can be illuminated. In particular, the means of illumination are designed as light-emitting diodes (LEDs), whereby the light intensity may be dynamically variable, which is why the illumination can be adapted to different conditions, for instance different target sizes or target distances. Accordingly, the camera preferably is designed in such a way that specifically or exclusively light having the wavelength of the illumination radiation used is acquired. To this end, the camera and the position-sensitive detector, respectively, may, at least essentially, be sensitive only for light having the corresponding wavelength or a filter may be installed. For instance, such a filter may permit to sort out light frequencies prior to the light being acquired by the detector, by only admitting light having determined wavelengths, or may be designed as an algorithm that is used for spectral filtration after acquisition.

According to another implementation of the invention, a picture position in an acquired picture is determined with the help of picture processing in such a way that the respective picture position represents a position of a radiation cross-sectional form acquired in the respective picture. In particular, the picture position is determined by means of calculating the center of gravity based on the radiation cross-sectional form acquired in the respective picture, particularly with the help of a brightness and/or contrast analysis and/or with the help of matching, particularly harmonizing, the radiation cross-sectional form acquired in the respective picture with a stored sample based on a best-fit method—this particularly including sub-pixel accuracy, with the respective target position of the radiation acquired in the picture being determined based on the harmonized position of the sample, particularly including sub-pixel accuracy. In particular, a piece of information permitting to derive a sample-internally defined sample position to be used for finally determining the target position is co-stored for the stored samples within the sample in this, specifically whereby the piece of information is the sample-internally defined sample position or a defined sample position determination algorithm, such as a sample center of gravity determination algorithm.

In accordance with a certain embodiment according to the invention, the laser tracker is characterized by a calibration functionality that, when executed, determines a known position and orientation of the camera and its optical axis, respectively, relative to the measurement axis and a known position and/or orientation of the target-seeking unit or of components of the target-seeking unit relative to the camera and/or measurement axis. In this, specifically the target is provided in different positions and targeted and measured with the help of the measurement radiation, at least one piece of target positioning information is determined for every position of the target using the target-seeking unit, and the measurement of the target and the target position information determined in this regard are used to derive a relative position and orientation.

Furthermore, the invention refers to a method for seeking and finding a target using a laser tracker, with the laser tracker being characterized by a base defining a vertical axis and a beam deflecting unit for emitting a measurement radiation and for receiving at least a part of the measurement radiation reflected by the target by means of a fine targeting detector, with the beam deflecting unit pivoting around the vertical axis and a tilt axis relative to the base in a motorized manner and a measurement axis being defined by an emission direction of the measurement radiation. Furthermore, the target is illuminated with electromagnetic illumination radiation and the illumination radiation reflected by the target is acquired in a position-sensitive manner, on the basis of which a piece of target position information can be derived, with a camera attached to the laser tracker and defining a field of view, including a position-sensitive detector, with the camera being offset to the measurement axis regarding its optical axis. The process of finding the target is performed depending on the position of the illumination radiation or a piece of target position information derived thereof.

Within the framework of the method, the process of finding the target specifically causes the determination of a, particularly azimuth angle-related, deviation of the measuring axis orientation from a direction to the target. According to the invention, the beam deflecting unit may be oriented automatically towards the target based on finding the target, particularly based on a roughly approximated position of the target determined on the basis of the search result, so that measurement radiation hits the target in such a way that reflected parts thereof can be acquired and detected by the fine targeting detector. For instance, a difference of the respective azimuthal and vertical azimuth angles may be calculated. As a consequence, the measurement radiation is oriented towards the target by changing the orientation of the beam deflecting unit until the difference value at least largely equals zero.

Furthermore, the invention refers to a computer program product with program code stored on a machine-parsable data storage medium for controlling and performing the method according to the invention, respectively.

Regarding a first aspect of the invention, the target-seeking unit of the laser tracker is equipped with at least one pair consisting of a first and a second mans of illumination, characterized by a fix distance to one another defining a first basic length and that may be known. In this, the means of illumination are arranged symmetrically around the optical axis in particular. By illuminating the target with illumination radiation of the pair, illumination radiation reflected by the target can be acquired as a first and second light spot through the camera. When executing the seeking functionality, at least one picture position is determined according to the invention depending on the first and/or second light spot, on the basis of which a piece of target position information can be determined. In so doing, a picture position may be the position of one of the two light spots in the picture or a joint position determined on the basis of the positions of both light spots, for instance. Furthermore, a piece of parallax correction information is determined by means of picture processing, within the framework of which a separation of the light spots is taken into account and that depends on a distance of the two light spots to one another. The parallax correction information may particularly be the value of the distance itself. In this case, the process of finding the target is performed using the at least one picture position depending on the parallax correction information.

The target-seeking unit according to the invention has the advantage of the light spots being used additionally in their separate appearance when the parallax correction information is determined, whereby, as opposed to only determining a single piece of target position information based only on a joint picture position by using both light spots, for instance by using a light spot position average, not only one piece of information on the direction to the target relative to the target-seeking unit can be determined; since the distance of the light spots generated by the two means of illumination on the detector, in the event of a fix distance between the illuminants, depends on the distance of the target to the laser tracker, the laser tracker according to the invention may also be used to determine a piece of information regarding the distance to the target as additional target position information. This way, the target can be found unambiguously. As a consequence, despite the parallax, i.e. the offset between the optical camera axis of the target-seeking unit and the measurement axis, the measurement beam can be directed towards the target in a direct step, without being dependent on any iterative approach. Furthermore, the process of unambiguously finding the target by means of an acquisition process also permits an orientation of the measurement beam towards a moving target.

As opposed to state-of-the-art target-seeking methods, the control and evaluating unit may be configured according to the invention in such a way that, when executing the seeking functionality, ambiguities present when using only one piece of target position information determined with the help of one picture position for finding the target and due to a parallax caused by the measurement direction and the optical axis of the camera, are resolved by using at least one position in the picture of the acquired illumination radiation and of the parallax correction information in order to find the target.

In order to find the target with the help of the target-seeking unit, the fix basic length specified explicitly or implicitly, e.g. in characteristic variables or value tables depending on it, is used particularly as described below. According to the invention, this length is defined by the distance of the pair of means of illumination to one another. Based on this knowledge, a piece of information determined on the basis of the distance of the light spots on the detector, caused by the radiation of the pair of means of illumination being reflected from the target, can be used to conclude the distance of the target, since the distance of the two light spots depends on the distance when the basic length is fix. Together with a target direction, resulting from a picture position determined on the basis of the reflected illumination radiation, generally known triangulation principles may be used, for instance, to localize the target with sufficient precision in order to permit fine targeting. On that note, the target-seeking unit according to the invention can be used in order to determine an unambiguous roughly approximated position of the target. According to the invention, the control and evaluating unit may alternatively be configured in such a way that a roughly approximated position is determined depending on a first and second target direction. Alternatively, a roughly approximated position may be determined according to the invention by being looked up in a look-up table where a roughly approximated position is read off directly when executing the seeking functionality based on picture positions and parallax correction information. Such an assignment with reference values may be stored in the control and evaluating unit, for instance.

When synoptically using the first and the second light spot in order to only determine a piece of target position information and an offset of the optical axis of the camera relative to the measurement axis of the measurement radiation, the target cannot be localized unambiguously using the camera, since one picture may only be used to derive one piece of directional information, but no determination of a distance to the target and therefore no localization of the target is possible. Therefore, the measurement beam cannot be oriented towards the target in one step. As a consequence, one advantage of using the two light spots generated by the two means of illumination positioned in a known ratio according to the invention is that the target can be located directly and no iterative approximation to the target is required, but targeting can be performed directly.

Another advantage of the present invention is that such a process of direct targeting is achieved using only one camera, i.e. without having to integrate any additional means into the target-seeking unit, e.g. a second camera. State-of-the-art target-seeking units are already equipped with the necessary means, particularly a camera with a position-sensitive detector and at least two means of illumination.

In order to increase the accuracy of the process of finding the target and/or in order to adapt to the size of the target, the target-seeking unit may be equipped with at least one additional pair of means of illumination, positioned at a distance to one another differing from that of the first pair of means of illumination, whereby a second, particularly a larger, basic length is defined. A larger basic length may mainly serve for increasing the accuracy of the process of determining the roughly approximated position and roughly approximated distance, respectively, if the target is relatively far away relative to the laser tracker, since the ration of basic length and target distance affects the error of measurement. A longer basic length is more favorable in this regard. When using retro-reflective targets, the basic length is limited by the fact, that the distance between means of illumination and camera may only be so large that retro-reflected illumination radiation can still be acquired by the camera, however. In this, the maximum possible distance depends on the size of the smallest reflector target to be found, amongst others. In order to achieve a basic length that is as long as possible, resulting in the highest possible accuracy, taking into account the maximum possible distance, the pair of means of illumination to be used for finding the target according to the invention may be selected depending on the nature of the target and/or the estimated distance to the target. This may be performed in an automated manner specifically by the control and evaluating unit. According to the invention, it is also possible to illuminate the target by several pairs of means of illumination and accordingly to acquire several pairs of light spots and to increase the accuracy of determining a direction to the target by independently determining four light spot positions, for instance, and, as a consequence thereof, two light spot distances. Particularly, the seeking functionality may initially be executed using the first basic length and, if the target cannot be found unambiguously by means of the aforementioned, a switch-over to using the second basic length may be performed.

Based on the described limitation of the maximum possible distance of the means of illumination to the camera and therefore to one another, the parallactic angle between the means of illumination of a pair of means of illumination normally is so small that the illumination radiation cross-sectional forms of the two acquired light spots overlap in the event of simultaneous illumination, which may result in an impairment regarding the determination of the respective light spot position. As a consequence and in accordance with the intention,

- illumination may be performed in a staggered manner so that the determination of the light spot position of the first means of illumination on the detector is not impaired by the illumination radiation of the second means of illumination,
- the illumination radiation of the individual means of illumination of at least one pair of means of illumination may differ, e.g. by the respective wavelength or polarization, so that the light spot position may be determined without any interaction, for instance by using a wavelength- or polarization-specifying filter, through a corresponding sensitivity of the position-sensitive detector, or by using several detectors with different sensitivities to radiation,
- segmentation of the different illumination radiation cross-sectional forms represented in a picture acquired by the camera by means of picture processing can be performed, according to the shape of the individual light spots to be expected, particularly segmentation of circular shapes, particularly of a defined diameter or diameter range that may be defined by a previously known nature of the reflected illumination radiation, which Circular Hough Transformation or scale-invariant Kernel operators are used for, and/or
- similar to the described determination of the individually occurring light spot position, the positions of the individual light spots are determined by matching with a "double light spot" sample in the event of an overlap, particularly using a best-fit method and sub-pixel accuracy.

According to the invention, matching with a "double light spot" sample may also be applied in order to determine the parallax correction information. For this, samples are stored that are specific for the respective parallax correction, for instance by being a measure of separation of the light spots based on their nature in each case, e.g. their size. By reference to the sample matching the current picture, a piece of parallax correction information is then read and used for finding the target. Alternatively, a piece of parallax correction information can be determined based on the individual picture position determination for the acquired illumination radiation of the first and second means of illumination by calculating a distance of the light spots by reference to the picture positions. According to the invention, the size of the common illumination radiation cross-sectional form from both light spots may also be used as a measure of separation, for instance by determining their longest extension through picture processing.

If the laser tracker according to the calibration is equipped with a calibration feature, the distance between a pair of means of illumination, i.e. the basic length, and possibly the position of the means of illumination and/or the camera and its optical axis is determined as the unit relevant for finding the target, when this feature is executed. Within the framework of calibration, at least one picture position and one piece of parallax correction information are determined particularly for every measured position of the target. Additionally or alternatively, determined values and the position of the target assigned to these values can be used according to the invention in order to perform a reference assignment of picture positions and parallax correction information to roughly approximated positions, which is then stored and made available for determining a roughly approximated position for finding the target.

Regarding the first aspect of the invention, the invention, as a complementary alternative, furthermore refers to a laser tracker, the target-seeking unit of which, instead of a pair of means of illumination and a camera, is equipped with at least one first means of illumination and at least one pair of optical mapping units each defining one field of view, whereby the basic length accordingly is not defined by the fix distance between two illuminants, but by a fix distance of the optical mapping units to one another. The first means of illumination irradiates the target with electromagnetic illumination radiation and the pair of optical mapping units is designed for acquiring the illumination radiation of the first means of illumination reflected by the target. The optical mapping units are installed so close to the first means of illumination that the cross-section of the illumination radiation bundle reflected by the target (at the location of the target-seeking unit) covers the optical mapping units (and their apertures, respectively), i.e. the two optical mapping units are located within this cross-section. The target-seeking unit is characterized by an optical axis that is defined, for instance, by the symmetry of the two optical axes of the optical mapping units or by the central emission direction of the means of illumination and that is staggered, particularly parallel staggered, to the measurement axis so that the offset defines a parallax. The target-seeking unit furthermore is characterized by at least one position-sensitive detector, the first optical mapping unit projects reflected illumination light of the means of illumination as a first light spot and the second optical mapping unit projects reflected illumination light of the means of illumination as a second light spot to. Alternatively, the target-seeking unit is equipped with one detector for each of the optical mapping units. By acquiring reflected illumination radiation in at least one picture in such a manner, at least one picture position is determined when the seeking functionality of the control and evaluating unit is executed, as already described with regard to this first aspect of the invention above, depending on the first and/or second light spot, whereby this picture position can be used in order to determine the target position information, and furthermore one piece of parallax correction information is determined with the help of picture processing, within the framework of which a separation of the light spots is taken into account and that depends on the distance of the two light spots to one another. In this case, the process of finding the target is performed using the at least one picture position depending on the parallax correction information so that a parallax defined by the measurement axis and the optical axis of the target-seeking unit is taken into account.

Analogous to the embodiment with several pairs of means of illumination described above, the target-seeking unit, in order to increase the accuracy of finding the target and/or to adapt to the size of the target, is optionally equipped with at least another pair of a third and a fourth optical mapping unit, in addition to the pair of a first and a second optical mapping unit, for acquiring the illumination radiation reflected by the target with a basic length differing from the first basic length. Optionally, the optical mapping units to be used are selected, particularly automatically, when executing the seeking functionality, depending on a known nature of the target, particularly its size, and/or a target distance estimation value.

If a common detector is being used for both optical mapping units, the illumination radiation cross-sectional forms of the two acquired light spots may overlap in the picture based on the limitation of the maximum possible distance of the optical mapping units. Analogous to the procedure described above with regard to the overlapping of the two light spots generated by the pair of means of illumination, the following options are provided as a consequence:
when executing the seeking functionality, a light spot and picture position, respectively, is acquired at different times by the optical mapping units,
the first means of illumination emits illumination radiation of different wavelengths, separable by the optical mapping units particularly by means of a filter, and/or polarization,
picture processing of the picture is used, particularly using edge detection, to segment the individual cross-sectional forms, particularly segmentation of circular shapes, and/or
matching, particularly harmonizing, the light spot shape acquired in the picture from the overlapping individual illumination radiation cross-sectional forms with a stored sample is performed based on a best-fit method, with the respective individual light spot position of the first and second light spots acquired in the picture being determined on the basis of the harmonized position of the sample in the picture.

Optionally, the laser tracker is characterized by a calibration functionality, analogous to the calibration functionality described above. When executing the calibration functionality, the distance between the optical mapping units relevant for finding the target, i.e. the basic length, and possibly the position of the means of illumination and/or of the optical mapping units and their optical axis, respectively, is determined. Within the framework of calibration, at least one picture position and one piece of parallax correction information, particularly for every measured position of the target, are determined. Furthermore or alternatively, the values determined with the help of the procedure described above and the position of the target assigned to these values can, according to the invention, be used for the reference assignment of picture positions and parallax correction information to roughly approximated positions, which is then stored and made available for determining a roughly approximated position for finding the target. Moreover and optionally,
a target provided in different positions is targeted and measured using the measurement radiation,
at least one picture position is determined for every position of the target, and
the relative position of the target-seeking unit regarding the measurement axis and the basic length are derived from the measurement of the target and the at least one picture position and parallax correction information determined in this regard, when executing the calibration functionality.

As another option, a picture position within a picture acquired with the help of one or both optical mapping units is determined with the help of picture processing, analogous to the approach described above, in such a way that the respective picture position represents a position in the picture of a radiation cross-sectional form acquired in the respective picture. In particular, a picture position is determined by means of calculating the center of gravity based on the radiation cross-sectional form acquired in the respective picture and/or with the help of matching the radiation cross-sectional form acquired in the respective picture with a stored sample based on a best-fit method, with the respective target position of the radiation acquired in the picture being determined based on the harmonized position of the sample. In particular, a piece of information permitting to derive a sample-internally defined sample position to be used when finally determining the target position is co-stored for the stored sample in this.

According to the embodiments and/or analogous approaches described, the additional options described above are also applied analogously to the laser tracker with at least one means of illumination and one pair of first and second optical mapping units.

Regarding the first aspect of the invention, the target is illuminated with illumination radiation within the framework of the method according to the invention by at least a first and a second means of illumination characterized by a fix distance to one another defining a first basic length. Illumination radiation reflected by the target is acquired as a first and a second light spot in the picture of a camera installed at the laser tracker. Regarding the first aspect of the invention, the method is characterized in that at least one picture position is determined based on at least one light spot, as well as the process of determining a piece of parallax correction information, where a separation of the light spots is taken into account and which depends on their distance, so that two independent pieces of target position information are present. In this case, the process of finding the target is performed using the at least one picture position and depending on the parallax correction information so that a parallax defined by the measurement axis and the optical axis of the camera is taken into account.

Alternatively, illuminating the target with electromagnetic illumination radiation by at least a first means of illumination is performed as a complementary solution within the framework of the method according to the invention regarding the first aspect of the invention, and illumination radiation reflected by the target is at least partially acquired in at least one picture as a first light spot by the first optical mapping unit positioned at the laser tracker and as a second light spot by a second optical mapping unit positioned at the laser tracker. Within the framework of this complementary solution and regarding the first aspect, the first basic length is defined by the distance of the first optical mapping unit to the second optical mapping unit.

Based on the method according to the invention, the acquired light spots can not only be used to derive a piece of information on a target direction, but additionally a piece of information on the distance to the target, permitting to unambiguously find the target despite the offset of the optical axis to the measurement axis so that the measurement beam can be directed towards the target in a direct manner, i.e. within the framework of only one seeking procedure. In particular, the method according to the invention can be used in order to determine a roughly approximated distance to the target, and/or to determine a roughly approximated position in the context of a determined target direction. Furthermore, a roughly approximated position of the target can be assigned to the determined picture position (s) and the parallax correction information directly on the basis of a stored reference in accordance with the invention, with this information possibly being determined according to the invention on the basis of two picture positions based on their distance to one another in the picture, for instance. For instance, such a reference is a multi-dimensional look-up table, within the framework of which roughly approximated positions can be found with regard to the picture position values, particularly using parallax correction information. According to the invention, a piece of parallax correction information may be determined alternatively based on a geometrical characteristic variable, e.g. the largest extension, the radiation cross-sectional form from the two light spots or with the help of harmonizing this cross-sectional form with a stored sample, a piece of parallax correction information has been assigned to.

Using methods according to the invention, ambiguities that are present when using only one piece of position information determined using the light spots for finding the target and due to a parallax defined by the measurement direction and the optical axis of the camera can be resolved by independently using both the first and the second light spot position and their distance to one another for finding the target.

According to another implementation of the invention, the process of finding the target is performed using several pairs of light spot positions and their distances to one another, whereby the accuracy of finding the target can be increased. In particular, averaging several determined roughly approximated distances, target directions, and/or roughly approximated positions may be performed. If this specific embodiment of the laser tracker according to the invention is equipped with several pairs of means of illumination with differing basic lengths, the accuracy can be improved according to the invention by jointly or selectively using one of these pairs of means of illumination. In particular, the means of illumination to be used for finding the target can be selected depending on the target size and/or a previously known target distance estimation value.

Regarding a second aspect of the invention, the camera is used to acquire a picture that is generated at least in part by illumination radiation reflected by the target, and a position is determined in the picture on the basis of this acquired illumination radiation, particularly by adopting the position of a light spot generated by it or by determining a position based on several, particularly two, light spot positions, preferably through position averaging. When executing the seeking functionality, the process of finding the target depends on the picture position. Furthermore, the target-seeking unit is equipped with an omnidirectional means for target distance determination, with the help of which a roughly approximated distance to the target is determined when the seeking functionality is executed, wherein a measurement signal is sent from the means for target distance determination to the target and received, with this signal being analyzed regarding time of flight, phase information, and/or strength. In this case and according to the invention, the process of finding the target is performed depending on the picture position determined using the position-sensitive detector using the determined roughly approximated distance.

As opposed to the state-of-the-art target seeking methods, the control and evaluating unit may be configured according to the invention in such a way that, when executing the seeking functionality, ambiguities that are present when using only one piece of target position information for finding the target and due to a parallax defined by the measurement direction and the optical axis of the camera, can be resolved by the roughly approximated distance as an additional piece of target position information for finding the target. As a consequence, unambiguous finding of the target can be performed. Thus, the measurement beam can be directed towards the target using one direct step, despite the offset between the optical camera axis of the target-seeking unit and the measurement axis, without being dependent on any iterative approach. Furthermore, the process of unambiguously finding the target according to the invention also permits to direct the measurement beam towards a moving target with the help of an acquisition process.

According to the invention, the target position information can be used to derive a target direction. Together with a roughly approximated distance determined with the help if the means for target determination the target can be localized using generally known triangulation principles, for instance, with a sufficient precision in order to permit fine targeting. Along these lines, the target-seeking unit according to the invention can be used to determine an unambiguous roughly approximated position of the target. According to the invention, a roughly approximated position can also be determined by looking it up in a look-up table, where a roughly approximated position can be read off directly based on picture positions and roughly approximated distances. Such an assignment with reference values may be stored in the control and evaluating unit, for instance.

When using only the one picture position determined on the basis of the picture made by the camera and an offset of the optical axis of the camera relative to the measurement axis of the measurement radiation, the target cannot be localized unambiguously, since only direction information can be derived from the picture in this case, but no distance to the target can be determined and therefore, the target cannot be localized. As a consequence, directing the measurement beam towards the target cannot be performed in one step. Therefore, an advantage of using a means for target distance determination according to the invention is that the target can be found unambiguously and no iterative approximation to the target is required, but the target can be targeted directly.

A target direction determined by analyzing the detector picture can be taken into account when determining a roughly approximated distance to the target according to the invention, particularly as a result of directing a sending direction of the measurement signal on the basis of the target direction or of the targeted selection on the basis of data already collected with the help of the means for target distance determination based on the information on the target direction. In the latter case, this may simplify and accelerate an analysis particularly in the event of large amounts of recorded data. Sending the measurement signal in a more targeted manner mainly is advantageous when the signal can or should be emitted with low levels of divergence and therefore a relatively small target area is covered.

According to the invention, the means for target distance determination may be designed as a means for generating a 3D picture of an environment. In particular, a range-picture camera (RIM camera) installed at the laser tracker that may be a part of the camera (24) is suitable in this regard according to the invention. Using the means for creating 3D pictures as a range finder, the distance and the relative position of multiple surface points of at least a part of the environment of the laser tracker, in which the target is assumed to be located, can be recorded roughly, which can be used according to the invention in order to create a 3D cloud of points. To this end, a measurement signal is emitted by the RIM camera, as known in the state of the art, reflected by the ambient surface, acquired by the RIM camera, and analyzed according to the indirect or direct time-of-flight method. In this case, the distance of one surface point located in a determined target direction derived particularly from the target position information is adopted as the roughly approximated distance. Alternatively and according to the invention, the 3D cloud of points and a depth picture created on the basis of this cloud, respectively, may be analyzed with the help of picture analysis in such a way that a picture of the target is found therein, for instance by recognizing the target with the help of object recognition, so that the roughly approximated distance results from at least one pixel assigned to the target and its related distance value.

According to the invention, the means for target distance determination can be designed as a range finder determining a distance in a way a person skilled in the art is familiar with by sending and receiving an electromagnetic or acoustic measurement signal with a field of view that is larger than the field of view for fine targeting, particularly a laser, radar, lidar, radio, or ultrasound range finder. In this, at least a part of the measurement signal is reflected by the target and received by a receiver unit of the range finder. Particularly when measuring the distance via radio, specifically when using WLAN, Bluetooth, or ultrawideband technology, the measurement signal can be received and immediately returned by a transceiver installed at the target instead. The roughly approximated distance to the target is then determined by analyzing a measurement signal characteristic changing with the covered distance, e.g. the time of flight of the signal, preferably by using the direct time-of-flight method (reducing a distance measurement to a time-of-flight measurement) or the signal phase, preferably using the indirect time-of-flight method. Alternatively or additionally, a roughly approximated distance can be determined using the received signal strength according to the invention that is compared to the known signal strength while sending, regarding a laser tracker equipped with a radio range finder, particularly determining an RSSI (Radio Signal Strength Indicator) value.

If the laser tracker, according to the invention, has a calibration functionality, particularly the position and orientation of the means for target distance determination relative to the optical axis and/or measurement axis of the beam deflecting unit are determined as the units relevant for finding the target, when this functionality is executed. Within the framework of calibration, the position of the illumination radiation reflected by the target and acquired by the camera within the target and the roughly approximated distance or a measured variable preceding the roughly approximated distance, e.g. the time of flight of the distance measurement signal, are determined in particular for every measured position of the target. According to the invention, these can be used to create and store an assignment of picture positions and roughly approximated distances to roughly approximated positions, which is used for finding the target as a reference for determining a roughly approximated position.

Regarding the second aspect of the invention, the method according to the invention is characterized in that a roughly approximated distance to the target is determined with the help of a distance measurement signal transmitted to and received from the target, the distance-depending time of flight, phase information, and/or strength of which is analyzed. The measurement signal is emitted and received by a means for target distance determination positioned at the laser tracker. According to the invention, the process of finding the target is performed depending on the picture position using the determined roughly approximated distance so that a parallax defined by the measurement axis and the optical axis of the camera is taken into account.

Based on the method according to the invention, the target can be found unambiguously despite the offset of the optical axis to the measurement axis, since the roughly approximated distance complements a piece of target position information in such a way that ambiguities resulting from this piece of information are resolved. In particular, the method according to the invention can be used to determine a roughly approximated position of the target based on a target direction derived from the picture position and the roughly approximated distance, with the help of which the measurement beam can be direct directly towards the target, i.e. in one step only. Furthermore, a roughly approximated position of the target can be assigned, according to the invention, to a determined piece of target position information and roughly approximated distance directly on the basis of the stored reference. For instance, such a reference includes a multi-dimensional look-up table, where roughly approximated positions belonging to target position information, light spot position values, and roughly approximated distances can be found.

In particular, the method according to the invention is characterized in that the means for target distance determination is designed as a means for creating 3D pictures, particularly an RIM camera, and that a roughly approximated distance is determined based on a 3D cloud of points created using the above representing numerous surface points of at least a part of the laser tracker environment. In this, the distance value of a point of the 3D cloud of points that is located in a target direction that is determined particularly based on a piece of target position information is adopted as the roughly approximated distance. Alternatively or additionally, a depth picture can be created according to the invention based on the 3D cloud of points and the target can be found therein with the help of picture analysis, e.g. object recognition or analysis of brightness values, and the distance of the corresponding data point can be used.

As an alternative to using a means for creating 3D pictures, a roughly approximated distance can be determined within the framework of the method according to the invention by sending an electromagnetic or acoustic measurement signal through the means for target distance determination, e.g. designed as a radar range finder, and the target reflecting or recording and, particularly immediately returning the measurement signal. A signal characteristic changing with the covered distance can be used, based on the measurement signal received by the means for target distance determination, to draw a conclusion regarding a roughly approximated distance. According to the invention, the following is analyzed:
- a measurement signal strength, particularly determining an RSSI value,
- a signal phase, particularly as indirect time-of-flight measurement of the measurement signal, and/or
- a signal time-of-flight, particularly as direct time-of-flight measurement of the measurement signal.

According to the invention, several pieces of target position information and/or roughly approximated distances can be used within the framework of the method so that the accuracy of the process of finding the target is increased according to the known principle of performing similar measurements several times and averaging the measured values obtained in each case. In particular, averaging can be performed using several target directions and/or roughly approximated distances or several roughly approximated positions can be determined and an average roughly approximated position can be calculated based on these several roughly approximated positions.

Regarding a third aspect of the invention, the laser tracker is equipped with illuminants, the illumination radiation reflected by the target of which permits a camera positioned at the laser tracker to acquire light spots. The control and evaluating unit is characterized by a seeking functionality that can be used for finding the target depending on the light spots. When executing the seeking functionality, the process of finding the target is based on active optical triangulation using a fix basic length that is either defined by the distance
  a) of a pair of means of illumination to one another,
  b) of a means of illumination for directed radiation emission to the projection center of a camera positioned at the laser tracker, or
  c) of two optical marks located at the target, designed as illuminants, particularly LEDs, or retro-reflectors, to one another,
so that a parallax defined by the measurement axis and the optical axis of the camera is taken into account.

Within the framework of the invention, the term active optical triangulation is to be understood as a determination of angular measures and/or measures of length for measuring purposes, specifically for determining a direction and/or distance to the target, using at least one triangle with a side of a previously known length, constituting a basis of the triangle, with the triangle being partially defined by the intersection of spatial light rays, representing light generated by at least one light source, specifically a means of illumination or an illuminant.

The triangulation according to the invention permits to configure the control and evaluating unit in such a way that, when executing the seeking functionality, the target can be found unambiguously, although there is a parallax defined by the measurement direction and the optical axis of the camera. As a consequence, the measurement beam can be directed towards the target in one direct step without the necessity of applying an iterative approach, which constitutes an advantage when compared to the state-of-the-art seeking functionalities. Another advantage of the present invention is that the process of unambiguously finding the target according to the invention with the help of an acquisition process also permits to direct the measurement beam to a moving target.

Using a state-of-the-art target-seeking unit, only one piece of target position information can be determined, which includes ambiguities excluding the unambiguous finding of the target. In particular, a traditional target-seeking unit only permits to determine one target direction only permitting an iterative orientation of the beam deflecting unit to the target due to the offset between the optical camera axis of the target-seeking unit and the measurement axis. Using the seeking functionality according to the invention that uses active optical triangulation using a basic length defined by the means mentioned above for finding the target, one piece of information on the position of the target is obtained that is so unambiguous that the beam deflecting unit can be directed towards the target in a single step. With the help of active optical triangulation, a first and a second target direction can be derived and a roughly approximated position of the target can be determined according to the generally known principles of triangulation using the fix basic length according to the invention, whereby the measurement beam can be directed directly towards the target. Alternatively or additionally, a roughly approximated distance to the target can be determined with the help of the triangulation according to the invention. Moreover, a roughly approximated distance or roughly approximated position can be looked up based on determined triangulation data on the basis of a stored referenced assignment according to the invention, where roughly approximated distances or roughly approximated positions are assigned to measures of triangulation. In particular, triangulation can be used to store determined angular measures and/or measures of length in a look-up table, on the basis of which referenced roughly approximated positions can be read out.

When executing the seeking functionality, one of the distances according to a), b), or c) is used as the basis of a triangulation triangle within the framework of triangulation. As another variable determining the triangle, the following is determined depending on the embodiment according to the invention
  a) a piece of distance information regarding the clearance between light spots generated by illumination radiation reflected by a target. This pair of light spots constitutes a picture of the pair of means of illumination along the path of light to and from the reflective target, whereby the target distance-depending parallactical angle to the basic length defined by the means of illumination can be observed, resulting from the clearance of the light spots to one another. By knowing another determining variable, e.g. the position of the detector of the camera or a target direction derived from the picture position of one of the two or both light spots, or direction of the reflected light ray, a roughly approximated position of the target serving for finding the target can be derived according to the invention.
  b) a direction of at least one light ray emitted by the means of illumination for directional radiation emission and the position of the light spot created by the light ray upon reflection by the target on the position-sensitive detector of the camera. Based on this light spot position, together with the projection center of the camera, a receiving direction of the light ray is defined. Based on the length of the base, the end points of which form the connection points of the light rays, and the two beam directions, a roughly approximated position of the target can be derived. Particularly, a roughly approximated distance to the target is determined according to the invention based on the known triangle determining variables. Together with a piece of target position information determined depending on the light spots, particularly a target direction, a roughly approximated position of the target serving for finding the target can be determined based on the aforementioned.

c) a piece of distance information regarding additional light spots, generated by the respective radiation of two optical marks on the target acquired by the camera of the target-seeking unit. This pair of light spots constitutes a picture of a pair of optical marks, whereby the distance of the light spot positions to one another depends on the target distance, which is a measure for the parallactical angle to the basic length defined by the illuminants. By knowing an additional determining variable, e.g. the position of the detector acquiring the radiation or a target direction derived from one of the or both light spot positions, or direction of the reflected light ray, a roughly approximated position of the target can be derived as a matter of principle, knowing the position of the optical marks relative to the target. According to the invention, a roughly approximated distance to the target is determined particularly by triangulation. Together with a piece of target position information determined depending on the light spots of the means of illumination, a roughly approximated position of the target serving for finding the target can be determined based on the aforementioned. In particular, in order to increase the reliability and/or accuracy of the process of determining the roughly approximated distance according to the invention, additional light spots of additional optical marks positioned at the target can be used analogously for active optical triangle calculation.

In order to determine a piece of distance information, matching with a stored "double light spot" sample may be performed according to the invention. For this, samples are stored that are specific for a respective clearance of two light spots, e.g. by them being a measure for the separation of the light spots due to their nature, e.g. their size. Based on the sample matching the current picture, a piece of distance information that may particularly be a distance value is then read off and used for finding the target. Alternatively, a piece of distance information can be determined based on a picture position determination for one individual light spot in each case by using the picture positions in order to calculate a distance of the light spots. As a measure for the distance, the size of the joint radiation cross-sectional form from both light spots may also be used according to the invention, e.g. by determining its longest elongation expanse with the help of picture processing.

For the purposes of triangulation according to embodiment a), the target-seeking unit may, according to the invention, be equipped with at least two pairs of means of illumination in order to increase the accuracy of the process of target finding and/or to adapt to the size of the target, the respective distance to one another of which defines one basic length in each case. The distance to one another differs, whereby two differently long basic lengths are defined. A long basic length can mainly serve to increase the accuracy of determining a roughly approximated position if the distance between target and laser tracker is relatively long, since the ratio of basic length and target distance affects the error of measurement. A longer basic length is more favorable in this regard. However, when using retro-reflective targets, the basic length is limited by the fact that the distance between means of illumination and camera may only be so long that retro-reflecting illumination radiation can still be acquired by the camera. In this, the maximum possible distance depends, amongst others, on the size of the smallest reflector target that is to be found. In order to achieve the longest possible basic length and therefore the highest possible accuracy taking into account the maximum possible distance, the pair of means of illumination to be used for finding the target according to embodiment a) may be selected, according to the invention, depending on the nature of the target and/or the estimated target distance. This may be performed particularly by the control and evaluating unit in an automated manner. According to the invention, the target can also be illuminated by several pairs of means of illumination and accordingly it is also possible to acquire several pairs of light spots and to increase the accuracy of determining a direction to the target by independently determining, for instance, four light spot positions and two distance values. In particular, the seeking functionality can initially be executed using the first basic length and, if the target cannot be found unambiguously by using this length, switchover to using the second basic length may be performed.

For the purposes of triangulation according to embodiment b), the laser tracker according to the invention is equipped with at least one illuminant, particularly the third means of illumination, which is capable of emitting illumination radiation in a directed manner. The target-seeking unit is equipped with the corresponding means for determining the illumination radiation emission direction. Furthermore, the directed illumination radiation can be used to illuminate the target in a structured manner, e.g. with the help of fringe projection or by projecting a light sample. In particular, this means of illumination is designed as a laser diode, preferably for emitting light with a wavelength in the IR range, a wavelength particularly differing from the wavelength or polarization of the first and second illuminants. The directed illumination radiation can either be acquired by the first camera disposing of means, for instance, in this regard enabling the camera to differentiate directed illumination radiation from other illumination radiation, e.g. picture processing algorithms, permitting a wavelength-dependent picture analysis or a detector with several specific wavelength-sensitive acquisition areas. Alternatively, the target-seeking unit may be equipped with a second camera with a known position and a second position-sensitive detector specifically for acquiring the illumination radiation of the third illuminant, which is equipped with a filter, for instance, capable of separating the different types of illumination radiation prior to or after acquisition, and the first camera can be equipped with a correspondingly contrary filter. The emission direction and the position of the means of illumination relative to the respective assigned camera, particularly relative to its optical axis, are known or can be determined according to the invention.

For the purposes of triangulation according to embodiment c), the means of illumination of the target-seeking unit are designed according to the invention in such a way that illumination radiation is emitted differing from the light of the optical marks regarding wavelength, phase, and/or polarization, in order to permit the assignment of the radiation acquired by the target-seeking unit to the respective light source. Accordingly, the camera may be equipped with means enabling the camera to differentiate the two types of radiation, e.g. picture processing algorithms, allowing for wavelength-dependent picture analysis or a detector with several specific wavelength-sensitive acquisition areas or means for light phase differentiation. Alternatively, the target-seeking unit may be equipped with a second camera with a known position and a second position-sensitive detector specifically for acquiring the light hitting the laser tracker from the optical marks of the target, which is equipped with a filter, for instance, capable of separating the means of illumination radiation from illumination radiation prior to or after acquisition. Accordingly, the first camera can be equipped with a contrary filter sorting out light of the optical marks.

If the laser tracker, according to the invention, is characterized by a calibration functionality, the distance of the components defining a triangulation base to one another is determined when executing the functionality, i.e. the distance of a pair of means of illumination, of a means of illumination to a camera projection center, or the distance of two optical marks at the target. Within the framework of calibration, the acquired light spot positions are determined particularly for every position of the target measured with the help of the beam deflecting unit. Additionally, additional positions and/or orientations of components of the target-seeking unit can be determined within the framework of the calibration according to the invention, e.g. in the presence of a means of illumination for emitting directed illumination radiation, the emission direction and position in relation to the related camera, or the position of optical marks at the target relative to the target. Moreover or alternatively, calibration can be used to create and store a reference assignment of light spot positions on the detector and/or triangulation dimensions, e.g. beam emission angle, to roughly approximated positions and may be used for finding the target. Based on such an assignment, it is particularly no longer necessary to expressly know a basic length for finding the target, since this length is incorporated into the assignment implicitly based on the calibration process.

Regarding the third aspect of the invention, the method according to the invention includes a process of finding the target depending on the acquired light spots of the illumination radiation. According to the invention, the method is characterized by a process of finding the target based on active optical triangulation using a fix basic length, which is defined by the distance a) of a pair of means of illumination to one another,
b) of a means of illumination for emitting directed illumination radiation to the projection center of a camera installed at the laser tracker, or
c) of two optical marks positioned at the target, designed as illuminants or retro-reflectors, to one another, so that a parallax defined by the measurement axis and the optical axis of the first camera is taken into account.

Based on the method according to the invention, it is possible to unambiguously find the target despite the offset of the optical axis to the measurement axis, since triangulation permits an unambiguous localization of the target, so that the measurement beam can be directed directly, i.e. in only one step, towards the target. In particular, the method according to the invention permits to derive a first and a second target direction that can be used to determine a roughly approximated position of the target. Alternatively or in addition to a target direction, triangulation can be used in order to determine a roughly approximated distance to the target. Moreover, a roughly approximated position of the target can be assigned directly to the determined triangulation data based on a stored reference according to the invention. For instance, such a reference includes a look-up table, where roughly approximated positions for the angular measures and measures of length determined with the help of active optical triangulation can be looked up. The method according to the invention can be used to resolve the ambiguities present when using only one piece of position information determined using the light spot positions for finding the target and through a parallax defined by the measurement direction and the optical axis of the camera, with the help of the additional piece of information of the roughly approximated position or roughly approximated distance, resulting from the triangulation method according to the invention.

According to the invention, one of the distances according to a), b) or c) forms the basic length of a triangulation triangle. Within the framework of the method, the process of triangulation may furthermore include a) a determination of a piece of distance information regarding the clearance of light spots to one another, created by the illumination radiation of the pair of means of illumination reflected by the target. Particularly, this piece of light spot position distance information, the basic length, and the position of the position-sensitive detector or a target direction, which may have been determined based on one or both light spot positions, are used to determine a roughly approximated position of the target,
b) a process of acquiring an illumination radiation emission direction of at least one means of illumination for the directed emission of radiation and the determination of the position of a light spot created by the above, through which a receiving direction is defined together with the projection center of a related camera of the target-seeking unit. In particular, a roughly approximated distance to the target is determined based on the emission direction, the receiving direction, and the basic length and/or a roughly approximated position is determined based on the triangulation data and the first and second light spot positions,
c) a determination of a piece of distance information regarding the clearance of light spots created by acquired radiation of optical marks positioned at the target. In particular, a roughly approximated distance to the target is determined based on the distance information, which may be the light spot position distance itself, the basic length, and the position of the position-sensitive detector or a target direction and/or a roughly approximated position is determined based on the triangulation data and the target position information that is determined depending on the illumination radiation light spots.

In order to determine a piece of distance information, matching with a stored "double light spot" sample may be performed according to the invention. For this, samples are stored that are specific for a respective clearance of two light spots, e.g. by them being a measure of the separation of the light spots due to their nature, e.g. their size. Based on the sample matching the current picture, a piece of distance information is then read off and used for finding the target, whereby this piece of information may particularly be a distance value.

Alternatively, a piece of distance information can be determined for a single light spot in each case on the basis of a picture position determination by using the picture positions to calculate a distance of the light spots. According to the invention, the size of the common radiation cross-sectional form of both light spots may also be used as a measure for the distance, e.g. by determining its longest expanse with the help of picture processing.

BRIEF DESCRIPTION OF THE DRAWINGS

The device according to the invention and the method according to the invention are described in more detail below in a merely exemplary manner using specific exemplary embodiments represented schematically in the drawings. In detail:

FIGS. 5a-c illustrate three embodiments of the targeting unit of laser trackers according to the invention;

DETAILED DESCRIPTION

Figure 1:
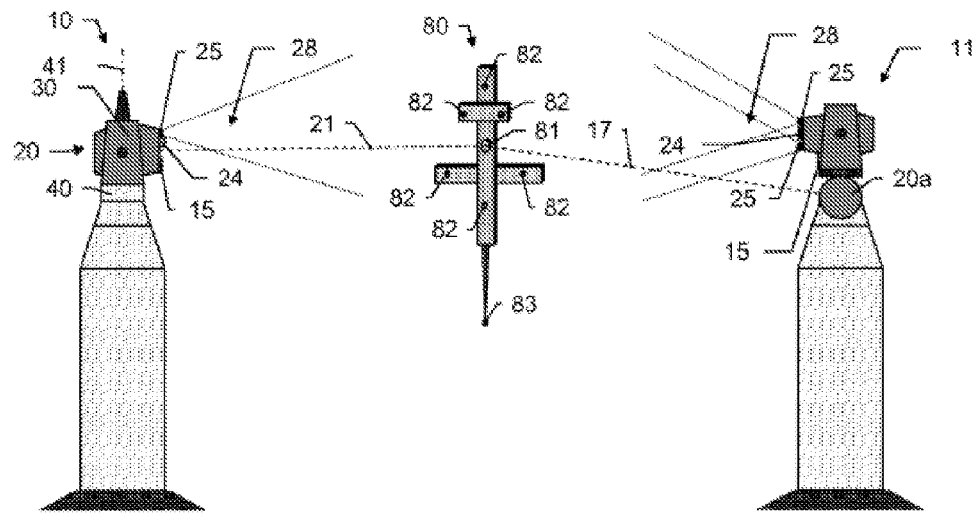
FIG. 1 illustrates two embodiments for laser trackers according to the invention and one auxiliary measuring tool with optical marks.

FIG. 1 illustrates two embodiments for laser trackers according to the invention 10, 11 and an auxiliary measuring tool 80, e.g. a tactile measuring device, characterized by a target 81. The first laser tracker 10 has a base 40 and a support 30, with the support 30 pivoting and rotating, respectively, around a pivot axis 41 defined by the base 40 relative to the base 40, particularly in a motorized manner. Furthermore, a targeting unit 20, which may be designed as a beam deflecting unit, is positioned at support 30 in such a way that the targeting unit 20 can be pivoted relative to the support 30 around a tilt axis (transit axis), particularly in a motorized manner. Thanks to an orientation option of the beam deflecting unit 20 provided by two axes this way, a laser beam 21 emitted by this unit 20 can be oriented flexibly and be used for targeting targets. In this, the pivot axis 41 and the tilt axis are essentially orthogonal to one another, i.e. minor deviations from an exact orthogonality of the axes may be predetermined and stored within the system, for instance for compensating errors of measurement resulting thereof.

In the illustrated layout, the laser beam 21 is directed towards the target 81, which is designed as a reflector, and is retro-reflected by this target 81 to the laser tracker 10. With the help of this measurement laser beam 21, it is possible to determine a distance to the target reflector 81, particularly with the help of a time-of-flight measurement, the phase principle, or the Fizeau principle. The laser tracker 10 is equipped with a fine distance measurement unit for determining this distance between the tracker 10 and the target reflector 81 and with protractors permitting to determine a position of the targeting unit 20, with the help of which the laser beam 21 can be oriented and guided in a defined manner, and therefore a propagation direction of the laser beam 21.

Furthermore, the laser tracker 10, particularly the targeting unit 20, is equipped with a picture acquisition unit 15 for the purposes of position determination of a sensor illumination on a sensor and in an acquired picture, respectively, a CMOS, or is designed particularly as CCD or pixel sensor array camera. Such sensors permit a position-sensitive detection of acquired illumination on the detector. Furthermore, the auxiliary measuring tool 80 is equipped with a tactile sensor, the contact point 83 of which can be contacted with an object to be measured. While there is a contact between the touch tool 80 and the object, it is possible to exactly determine a position of the contact point 83 in space and thereby the coordinates of a point at the target object. This determination is performed with the help of a defined relative position of the contact point 83 regarding the target reflector 81 and regarding optical marks 82 positioned at the auxiliary measuring tool 80, which can be designed as light-emitting diodes, for instance. Alternatively, the optical marks 82 can also be designed in such a way that they reflect the incoming radiation when being illuminated, e.g. using radiation of a defined wavelength (auxiliary point marks 82 designed as retro-reflectors), particularly show a certain illuminated characteristic, or that they are characterized by a defined sample or color coding. As a consequence, the position and distribution, respectively, of the optical marks 82 in a picture acquired with the sensor of the picture acquisition unit 15 can be used to determine an orientation of the touch tool 80.

The second laser tracker 11 is equipped with a beam deflecting unit 20a separate from the picture acquisition unit 15 for emitting a second laser beam 17 that is directed towards the reflector 81 as well. Both, laser beam 17 and the picture acquisition unit 15 can be pivoted by a motor around two axes and, as a consequence, can be oriented in such a way that the picture acquisition unit 15 is capable of acquiring the target 81 targeted with the laser beam 17 and the marks 82 of the auxiliary measuring tool 80. Therefore, a precise distance to the target reflector 81 and an orientation of the tool 80 can be determined based on the spatial position of the marks 82 here as well.

For the respective orientation of the laser beams 17, 21 to the target reflector 81, the means of illumination 25 for the divergent illumination of the auxiliary measuring toll 80 and, in this, mainly the target reflector 81 with radiation 28 of a certain wavelength, particularly in the infrared wavelength area are designed at the laser trackers 10, 11 as part of a target-seeking unit in each case, and additionally at least one camera 24 with a position-sensitive detector. The illumination radiation 28 reflected by the target reflector 81 and returned to the laser tracker 10, 11 can be detected as a light spot for the illumination radiation of each means of illumination within a picture of camera 24 and, using the position-sensitive detector, a position of the target 81 can be mapped on the detector that can be determined as a picture position of at least one light spot. As the person skilled in the art will understand from the context anyway, the term picture does not refer to a clear picture, but to a projection of at least a part of the illumination radiation bundle reflected to the detector. Thus, a control and evaluating unit with a seeking functionality, integrated into the laser trackers 10, 11, can be used to determine a target position of the target reflector 81 both with the first laser tracker 10 and with the second laser tracker 11 and, depending on this position, the target (reflector 81) can be found and the beam deflecting unit 20 can be directed towards the target 81. For instance, upon successful finding of the target 81 according to the invention, a direction to the target 81, when viewed from the targeting unit, and its deviation from the known orientation of the measurement laser beam 17, 21 can be determined. The deviation can be quantified regarding the difference of the two azimuth angles of the laser beam direction known through the protractors and the corresponding calculated angles of the target direction, for instance by calculating the respective difference. The measurement radiation 17, 21 can be directed towards the target reflector 81 automatically, e.g. by changing the laser beam direction until all deviations of the azimuth angles have been eliminated or until these are within the specified limits.

In addition to the target-seeking unit for finding the target 81, the laser trackers 10, 11 are equipped with a fine targeting detector serving for fine targeting and tracking a found target 81. Therefore, the beam deflecting unit 20 can be oriented towards the target reflector 81 according to the invention based on the search result, particularly based on a target direction determined by the above, until measurement radiation 17, 21 reflected by the target 81 hits the fine targeting detector, whereby the laser beam 17, 21 is coupled to the target 81 ("lock-on") and therefore the process of orienting the laser beam 17, 21 is terminated based on finding the target. Subsequent fine orientation of the measurement beam 17, 21, particularly towards the center of the target reflector 81, and tracking of a moving target 81 are then controlled based on the information provided by the fine targeting detector. If coupling is lost afterwards, e.g. due to an obstacle in the field of view moving into the line of sight between the laser tracker 10, 11 and the auxiliary measuring tool 80, the process of finding the target 81 using the target-seeking unit is repeated; particularly once the line of sight has been restored.

In this context, the means of illumination 25 and the cameras 24 may be positioned at the picture acquisition unit 15, the beam deflecting unit 20a, the support 30, or the base 40 in respectively defined positions, for instance.

Furthermore, an orientation of the beam deflecting unit 20a and targeting unit 20, respectively, according to the invention can also be used for orientation determination for laser trackers without picture acquisition unit 15 (6-DoF camera) of an auxiliary measuring tool 80 (3D laser tracker).

Figure 2A:
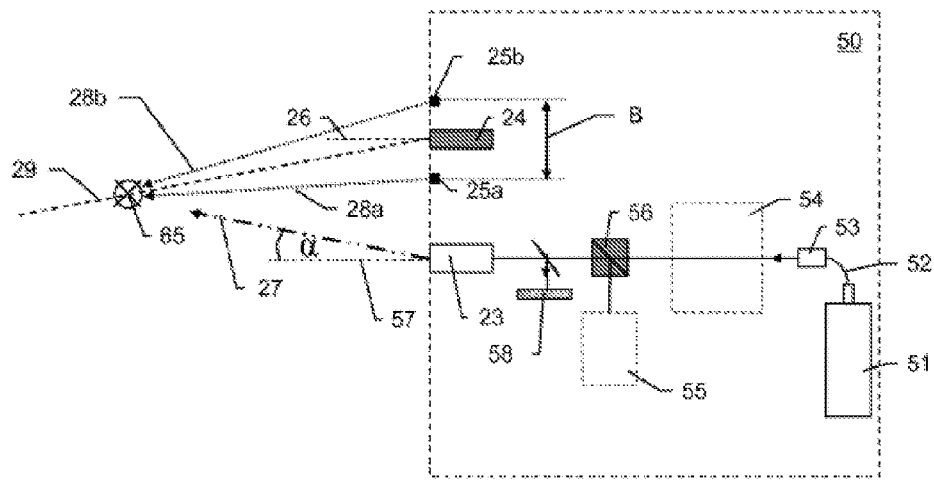
FIGS. 2a-c illustrate three conceptual embodiments of a laser tracker according to the invention.
Figure 2B:
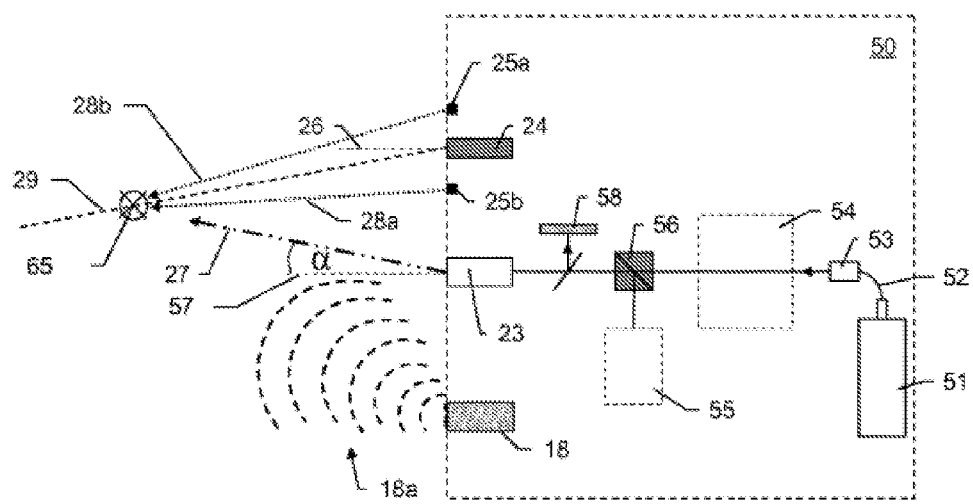
Figure 2C:
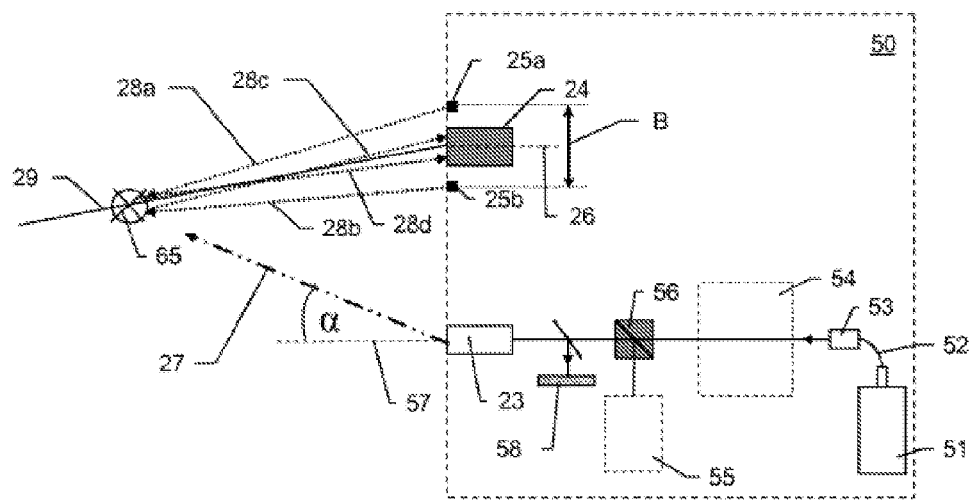

FIGS. 2a-c illustrate embodiments of a laser tracker according to the invention, particularly regarding its optical design. A common fact of all of the embodiments is that an optical unit 50 of the laser tracker is characterized by a laser beam source 51—for instance, an HeNe laser source or a laser diode—and a collimator 53 for coupling the laser radiation generated using the beam source 51 into the measurement beam path. Within the framework of the layout illustrated, the radiation is guided with the help of an optical fiber 52 from the laser beam source 51 to the collimator 53, but can also be coupled in to the measurement beam path directly or through optical means of deflection alternatively. A lens 23 is used in order to direct the measurement laser beam to the outside. The optical unit 50 additionally is equipped with an interferometer unit 54, with the help of which changes regarding the distance to the target 65 can be detected and measured. The radiation generated by the radiation source 51 is used as measurement radiation for the interferometer 54, segregated into a reference path and a measuring path within the interferometer 54, and detected together with the reference beam on a detector after the measurement beam was reflected by the target 65. Furthermore, an absolute distance measurement unit 55 with an additional radiation source and an additional detector is designed. This unit 55 serves for determining the distance to the target 65, whereby a beam separator 56 is used in order to guide the radiation generated by the above to a joint measurement beam path, together with the interferometer radiation. The layout of the optical components and the path of the measurement radiation within the optical unit 50 define a measurement direction and a measurement axis 57, respectively. In order to precisely determine a distance to the target, measured values of both absolute range finder 55 and interferometer 54 can be taken into account and linked in particular. In a special embodiment of a laser tracker, the absolute range finder 55 and the interferometer 54 may define different measurement beam paths and/or may be positioned in a structurally separate manner, particularly in different measuring groups.

Furthermore, the optical unit 50 is equipped with a camera 24 with an optical axis and acquisition direction 26, respectively, and a position-sensitive detector as part of a target-seeking unit in all embodiments, with the camera defining a field of view. Moreover, the means of illumination 25a, 25b are positioned at the camera 24 that can be used to emit electromagnetic radiation 28a, 28b for illuminating the target 65. When executing the seeking functionality, illumination radiation reflected by the target 65 is acquired in a picture of the camera 24, e.g. as at least one light spot. A piece of picture information obtained thereof, particularly a position of one or several light spots in the picture, is used for finding the target 65. This is possible, since the position of the acquired radiation in the picture depends on the position of the target 65.

Furthermore, a fine targeting detector 58 (PSD) within the optical unit 50 is positioned in such a way that measuring laser radiation reflected from the target 65 can be detected on this detector. With the help of these PSDs 58, it is possible to determine a deviation of the acquired beam from a detector zero and to track the laser beam to the target 65 based on the deviation. To this end and in order to achieve high levels of accuracy, the field of view of this fine targeting detector 58 is selected to be as small as possible, i.e. corresponding to the beam diameter of the measurement laser beam. Acquisition using the PSDs 58 is performed coaxially to the measurement axis 57 so that the acquisition direction of the fine targeting detector 58 corresponds to the measurement direction. PSD-based tracking and fine targeting can only be applied after the measuring laser has been oriented towards the target based on finding the target 65.

The context between a picture position of a light spot created by a means of illumination 25a, 25b and the position of the target 65 is not bijective. In particular, this can only be used to determine a target direction 29. Thus, there is an ambiguous piece of target position information. Due to the offset between the optical axis 26 and the measurement axis 57 it is therefore not possible to orient the laser beam towards the target 65 using one step, since this can only be performed in the event of an unambiguous, determined roughly approximated position of the target 65.

The embodiment of the laser tracker according to the invention pursuant to FIG. 2a resolves this ambiguity by using the illumination radiation 28a and/or illumination radiation 28b acquired in the picture of camera 24 in order to determine at least one picture position, whence a piece of target position information can be derived and furthermore a piece of parallax correction information is determined, depending on a distance of the light spots created by both illumination radiations, which is why the separation of the two light spots is taken into account. The extent of separation, i.e. how much the light spots created by the means of illumination 25a and 25b are separated in the picture, with a fix basic length B as the distance of the two means of illumination 25a and 25b, depends on the distance of the target 65 to the camera 24 and to the laser tracker, respectively, which is decisive for the extent of the parallax, which is why, as a consequence of the extent of separation, a piece of information regarding the correction of the parallax can be determined. Taking into consideration the orientation and position of the detector, the at least one picture position and the parallax correction information can thus be used in principle in order to determine a roughly approximated position of the target, e.g. with the help of a mathematic-geometric triangle structure.

As an alternative complementary solution, the optical unit 50 is equipped with a second camera defining a field of view, instead of a second means of illumination 25b, with this camera, just like the first camera 24, being positioned so close to the means of illumination 25a that illumination radiation 28a reflected by the target falls into both camera apertures. Instead of two complete cameras, two lenses positioned close to the means of illumination and with a clearance between them are used as alternative optical mapping units for detecting reflected illumination radiation, projecting illumination radiation reflected by the target 65 to a joint detector. The fix basic length B is defined by the known distance of the two cameras and lenses, respectively, to one another. Analogous to the paragraph above, the reflected illumination radiation is used to determine at least one picture position that can be used to derive a piece of target position information, and furthermore a piece of parallax correction information is determined depending on a distance of the light spot created by the illumination radiation of the first camera 24 to the light spot created in the second camera, whereby the separation of the two light spots is taken into account as parallax correction information. Taking into account the orientation and position of the detector and the detectors, respectively, the at least one picture position and the parallax correction information can thus be used in principle to determine a roughly approximated position of the target as described above.

Thus, unambiguously finding the target 65 is possible in such a way that, despite the parallax between the optical axis 26 and the measurement axis 57, the measurement radiation can be directed towards the target 65 in one step. In particular, the given data and the data determined by the target-seeking unit can be used to calculate a roughly approximated distance to the target 65 or it can be determined on the basis of a stored parallax correction information assignment, which is used together with a target direction 29 determined on the basis of one or both light spot positions in order to determine the roughly approximated position of the target 65 and/or to determine a direction 27 from the laser tracker to the target 65. For instance, the discharge point of the measurement axis 57 from the optical unit 50 is used as the starting point of the direction 27 to the target 65, the position of which relative to the optical axis 26 of the camera 24 or detector position is known. By knowing the direction 27 to the target 65 and the orientation of the measurement axis 57, a deviation a of the respective azimuth angles is calculated (FIG. 2a includes an exemplary representation of a deviation a for an azimuth angle), which serves as a measure for orienting the beam deflecting unit towards the target 65.

The embodiment of the laser tracker according to the invention pursuant to FIG. 2b resolves the above-mentioned ambiguity of the target position information by the target-seeking unit being equipped with an omnidirectional means for target distance determination 18 in addition to the camera 24, with the help of which a roughly approximated distance to the target 65 is determined, e.g. designed as a radio range finder. The acquired illumination radiation 28a and 28b of the means of illumination 25a and 25b is used to determine a position on the detector of the camera 24, e.g. by determining an average position on the detector using the two light spots created by light 28a and 28b in each case, i.e. combining the two light spots to become a single, joint piece of position information. At this point, this picture position, as target position information that does not permit to unambiguously find the target per se, is complemented by a roughly approximated distance to the target 65 determined with the help of the omnidirectional means for distance determination 18 according to the invention, whereby a roughly approximated position of the target 65 can be determined as a matter of principle. According to the invention, the process of finding the target depends on the picture position, using the roughly approximated distance so that, despite the parallax between optical axis 26 and measurement axis 57, the measurement radiation can be directed towards the target in one step. In order to determine the roughly approximated distance, the means for distance determination 18 emits a measurement signal 18a, reflected or returned at least partially by the target 65, acquired by a receiving unit of the means for distance determination 18, and analyzed regarding a distance-dependent time of flight, piece of phase information, and/or strength, allowing for drawing a conclusion regarding the distance to the target 65. Thus, unambiguously finding the target is possible in such a way that, despite the parallax between the optical axis 26 and the measurement axis 57, the measurement radiation can be oriented towards the target 65 in one step. In particular, the given data and the data determined by the target-seeking unit can be used to calculate a roughly approximated distance to the target 65, which is used for determining the roughly approximated position of the target 65 and/or for determining a direction from the laser tracker to the target, together with a target direction determined based on one or both light spot positions, e.g. by means of a geometrical structure or a trigonometric calculation. For instance, the discharge point of the measurement axis 57 from the optical unit 50 is used as the starting point of the direction 27 to the target 65, the position of which relative to the optical axis 26 of the camera 24 or detector position is known. By knowing the direction 27 to the target 65 and the orientation of the measurement axis 57, a deviation a of the respective azimuth angles is calculated (FIG. 2b includes an exemplary representation of a deviation a for an azimuth angle), which serves as a measure for orienting the beam deflecting unit towards the target 65.

The embodiment of the laser tracker according to the invention pursuant to FIG. 2c resolves the above-mentioned ambiguity of the target position information by performing the process of finding the target 65 on the basis of active optical triangulation using a fix basic length, which is defined by the distance of the two means of illumination 25a and 25b to one another. Alternatively, the process of finding the target is based on active optical triangulation in other embodiments according to the invention, within the framework of which a basic length is used that is either defined by the distance of the optical marks at the target 65 or by the distance of one, particularly the third, means of illumination to the projection center of a camera positioned at the laser tracker. Within the framework of the embodiment pursuant to FIG. 2c, another variable used for the purposes of triangulation is the distance of the first and second light spots to one another, created on the position-sensitive detector of the camera 24 by the illumination radiation 28*c* reflected by target 65 (coming from the first means of illumination 25*a*) and the illumination radiation 28*d* reflected by target 65 (coming from the second means of illumination 25*b*). Since the extent of this light spot distance depends on the distance of the target 65, triangulation can be used as a matter of principle in order to determine a piece of distance information, particularly taking into account the position of the position-sensitive detector, whereby the ambiguity of the target position information can be resolved and unambiguously finding the target 65 can be performed, despite the parallax defined by the measurement axis 57 and the optical axis 26. Thus, unambiguously finding the target 65 is possible in such a way that the measurement radiation can be directed towards the target 65 in one step. In particular, the given data and the data determined by the target-seeking unit can be used to calculate a roughly approximated distance to the target 65 that is used for determining the roughly approximated position of the target 65 and/or for determining a direction from the laser tracker to the target 65, together with a target direction determined based on one or both light spot positions. For instance, the discharge point of the measurement axis 57 from the optical unit 50 is used as the starting point of the direction 27 to the target 65, the position of which relative to the optical axis 26 of the camera 24 or detector position is known. By knowing the direction 27 to the target 65 and the orientation of the measurement axis 57, a deviation of the respective azimuth angles is calculated (FIG. 2*c* includes an exemplary representation of a deviation a for an azimuth angle), which serves as a measure for orienting the beam deflecting unit towards the target 65.

FIGS. 3*a*-3*g* illustrate examples for approaches for finding the target with laser tracker embodiments according to the invention. In this, it is understood that the lengths and sizes illustrated in the figures are of an exemplary nature only and should not be understood as being true to scale.

FIGS. 3*a*-3*d* illustrate the beam path of the illumination of a retro-reflective target 81 with an embodiment of the target-seeking unit according to the invention with two means of illumination 25*a* and 25*b*, the distance of which defines a basic length B (FIGS. 3*a*, 3*c*), or the beam path of the illumination of a retro-reflective target 81 with an embodiment of the target-seeking unit according to the invention with one means of illumination 25*a* and two cameras as optical mapping units 24E and 24Ea, the distance of which defines a basic length B (FIGS. 3*b*, 3*c*), and where the process of finding the target 81 is performed by determining at least one picture position based on illumination radiation 28*a* and 28*b* and a piece of parallax correction information acquired with the help of the detector 24D, and an example for a geometrical target roughly approximated position determination based thereon.

Figure 3A:
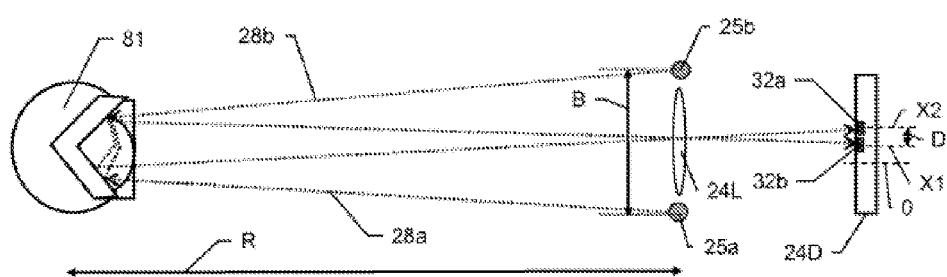
FIGS. 3a-h illustrate four examples for target finding using laser tracker embodiments according to the invention.

In FIG. 3*a*, the target, the retro-reflector 81, is illuminated by the light 28*a* of the means of illumination 25*a*, e.g. an IR-LED. The illumination radiation reflected by the retro-reflector 81 is mapped to the position-sensitive detector 24D by the camera lens 24L, whereby a first light spot 32*a* is created on the detector 24D. Accordingly, the illumination radiation 28*b* of the means of illumination 25*b* creates a light spot 32*b* and both light spots 32*a* and 32*b* are acquired in one picture by the camera. One or both positions of the light spots 32*a* and 32*b* are used in order to determine at least one picture position X1 and X2, respectively, regarding a previously defined zero point 0 of the detector and in the picture, respectively. In FIG. 3*a*, this is represented referring to one dimension in an exemplary manner. According to the invention, a picture position can also be determined on the basis of a joint consideration of both light spots 32*a* and 32*b*. When determining the parallax correction information, a separation of the two light spot positions is taken into consideration in any case, which depends on their distance to one another. For instance, this may be performed by using the distance itself as parallax correction information, which can be calculated based on the two picture positions X1 and X2, for instance. According to the invention, these two pieces of target position information (at least one picture position and the parallax correction information) serve for determining a roughly approximated distance R to the target, for instance, that refers to the distance between the center of the retro-reflector 81 and the joint zero axis of the means of illumination 25*a* and 25*b* and the center of the camera lens 24L within the framework of the example.

Figure 3B:
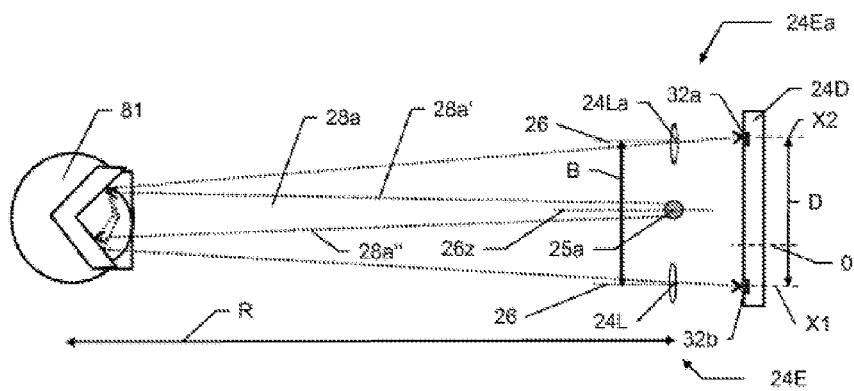

In FIG. 3*b*, the target, the retro-reflector 81, is illuminated by the light 28*a* of the, in this case, single means of illumination 25*a*, e.g. an IR-LED. One part 28*a*' of the illumination radiation reflected by the retro-reflector 81 is mapped to the position-sensitive detector 24D of the optical unit 24E by the first optical unit 24E that is positioned near the means of illumination 25*a* and equipped with a first camera lens 24L, whereby a first light spot 32*a* is projected on the detector 24D. Accordingly, the second optical unit 24Ea that is positioned near the means of illumination 25*a* and equipped with a second camera lens 24La uses another part 28*a*" of the illumination radiation of the means of illumination 25*a* to create a light spot 32*b* on the position-sensitive detector 24D as a joint component of both optical units 24E and 24Ea. Thus, the two camera lenses 24L and 24La are positioned so close to and around the means of illumination 25*a* that each covers one partial area of the bundle of light returned by the retro-reflector 81.

Both light spots 32*a* and 32*b* are acquired in one picture. Alternatively, two detectors—one for each camera lens 24L and 24La—and two cameras with a known distance to one another, respectively, are used instead of a joint detector 24D. Analogous to the approach described according to FIG. 3*a*, one or both positions of the light spots 32*a* and 32*b* are used in order to determine at least one picture position X1 and X2, respectively, and, when determining the parallax correction information (referring to the parallax defined by the measurement axis and the optical axis 26*z* of the target-seeking unit), a separation of the two light spot positions is taken into account, depending on their distance to one another. According to the invention, these two pieces of target position information (at least one picture position and the parallax correction information) serve for determining a roughly approximated distance R to the target, for example, referring to the distance between the center of the retro-reflector 81 and the connecting line of the means of illumination 25*a* with the centers of both camera lenses 24L and 24La within the framework of the example.

Figure 3C:
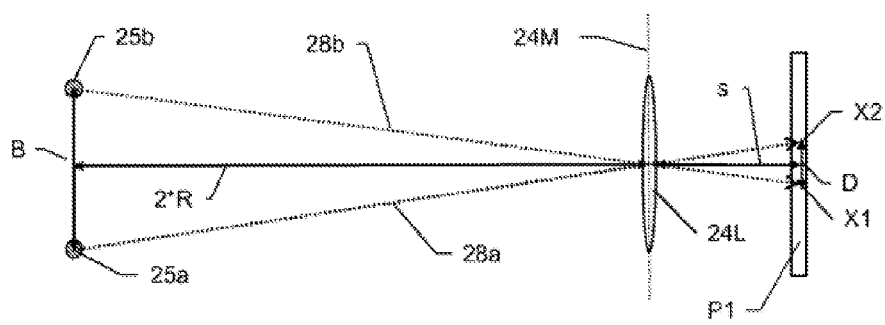
Figure 3D:
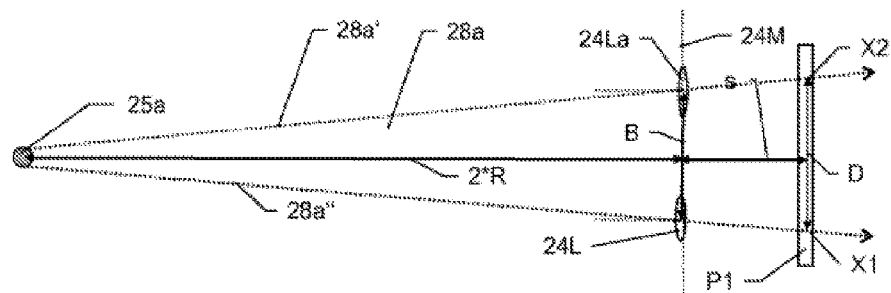

The process of finding the retro-reflector target 81 by determining its roughly approximated position is illustrated in an exemplary manner in FIG. 3*c* for the embodiment according to the invention pursuant to FIG. 3*a*, and in FIG. 3D for the embodiment pursuant to FIG. 3*b*. The means of illumination 25*a* and 25*b* (FIG. 3*c*) and the two parts 28*a*' and 28*a*" of the illumination radiation of the single means of illumination 25*a* (FIG. 3*d*), respectively, are mapped by the camera lens 24L (FIG. 3*c*) and 24L and 24La, respectively, in a position X1 and X2, respectively, in picture P1, taken with the help of the position-sensitive detector 24D in the known distance s to the middle level 24M of the camera lens 24L (FIG. 3c) and 24L and 24La (FIG. 3d), respectively, whereby the position of the picture is defined. Since the retro-reflector 81 in FIGS. 3a and 3b, respectively, characterized by distance R to the center of the camera lens 24L in the z-direction of the Cartesian coordinate system, retro-reflects the light 28a and 28b (FIG. 3c) and the parts 28a' and 28a" (FIG. 3d), respectively, this corresponds to a picture of the basic length B on the distance length D between the two light spot and picture positions, respectively, where the two means of illumination 25a and 25b (FIG. 3c) and the two camera lenses 24L and 24La (FIG. 3d), respectively, adopt the double distance 2*R in z-direction to the center of the camera lens 24L (FIG. 3c) and to the means of illumination 25a (FIG. 3d), respectively. According to the invention, this distance 2*R is determined according to basic geometrical methods (e.g. theorem of intersecting lines, trigonometry), e.g. using triangulation methods applying the distance length D, the basic length B defined by the distance of the two means of illumination 25a and 25b (FIG. 3c) and the distance of the two camera lenses 24L and 24La (FIG. 3d), respectively, and the distance s. Together with a target direction determined on the basis of one or both picture positions X1, X2, this is used to determine an unambiguous roughly approximated position of the target. According to the invention, a look-up table may be developed and stored within the laser tracker alternatively based on known target positions, e.g. through calibration, where picture positions X1 and/or X2 and parallax correction information (which may even only be included implicitly based on the picture positions X1 and X2) are assigned to the underlying target (roughly approximated) positions and, when executing the seeking functionality, these are looked up in the referenced look-up table based on the determining variables, instead of calculating a roughly approximated position based on the determining variables.

Figure 3E:
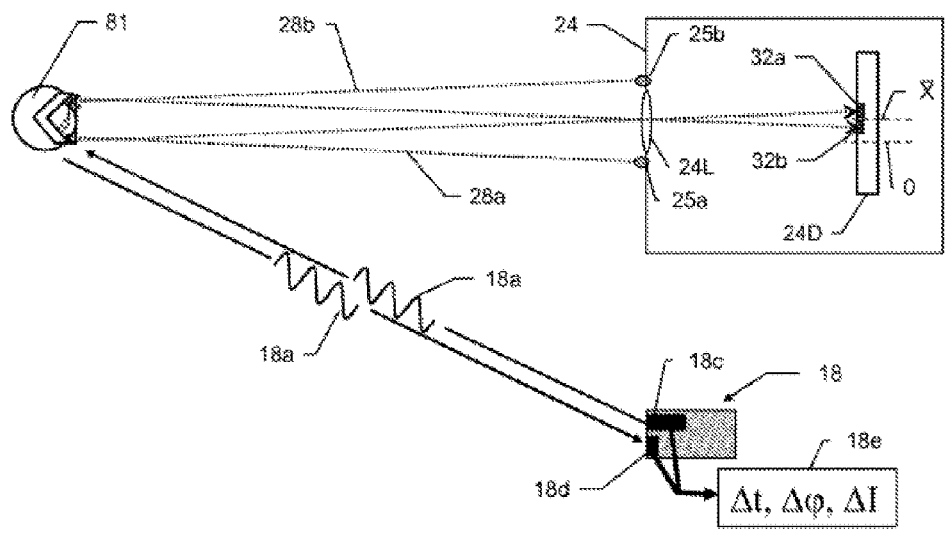
Figure 3F:
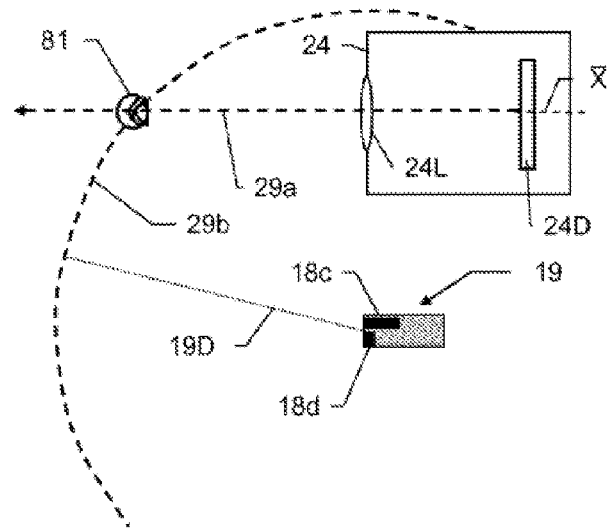

The FIGS. 3e and 3f illustrate the beam path of the illumination of a retro-reflective target 81 with an embodiment of the target-seeking unit according to the invention including means of illumination, e.g. designed as LEDs 25a and 25b, and camera 24 with camera lens 24L, on the detector 24D of which the acquired illumination radiation 28a and 28b of the LEDs 25a and 25b is used to determine a piece of target position information, and an omnidirectional means for target distance determination 18 for determining a roughly approximated distance 19D to the target and an example for a geometrical target position determination based thereon.

In FIG. 3e, the target, the retro-reflector 81, is illuminated by the light 28a of the means of illumination 25a, e.g. an IR-LED. The illumination radiation reflected by the retro-reflector 81 is mapped to the position-sensitive detector 24D by the camera lens 24L, whereby a light spot 32a is created on the detector. Accordingly, the illumination radiation 28b of the means of illumination 25b is acquired as light spot 32b by the camera. Both are summarized to determine an average picture position $\overline{X}$, referring to a zero point 0 of the detector. Alternatively, it is also possible to only use one picture position created by one of the two illumination radiations. Since the position of the average Position $\overline{X}$ depends on the position of the target 81, this can be used to derive a piece of target position information that is ambiguous, however. In order to resolve the ambiguities, a signal sending unit 18c of the means for target distance determination 18, positioned at the laser tracker in a known relative position to the camera 24, emits a measurement signal 18a for the purpose of determining a distance, e.g. modulated radiation, with this signal being at least partially reflected by the retro-reflector 81 towards the laser range finder 18 and being received by a signal receiving unit 18d, whereby a modulated signal is demodulated by integrating intensity measurements, for instance. In this, the measurement signal can be reflected by the reflector 81 through the actual retro-reflecting parts, but for instance depending on the form of the omnidirectional means for target distance determination 18, its orientation to the laser tracker, and/or the nature of the signal 18a, can also be performed by other components of the target 81, e.g. its housing. Both, when emitting and receiving, at least one characterizing signal measured variable is recorded in each case and then the difference 18 concerning this between outgoing and incoming signal is determined. According to the invention, the extent of such a difference depends on the distance to the target 81, which is why the signal measured variable is the time ($\Delta t$, time of flight of the signal), the signal phase ($\Delta \varphi$, phase difference), and/or the signal strength ($\Delta I$, signal intensity). However, other measurement signal characteristics changing with a distance are suitable as well.

The process of finding the retro-reflector target 81 by determining its roughly approximated position is illustrated exemplarily in FIG. 3f for the embodiment according to the invention pursuant to FIG. 3e. Based on the average picture position $\overline{X}$, a target direction 29a can be derived taking into account parameters of the camera 24, such as orientation and position of the optical axis, and of the detector 24D. According to the invention, such a piece of target position information is used for finding the target 81. Since, due to the parallax between optical axis and measurement axis, a target direction 29a alone is not sufficient in order to direct the measurement beam directly towards the target 81, a roughly approximated distance 19D to the target 81 is used as a second piece of information. Within the framework of this example, a range finder 19 is used in order to determine the distance, with the help of which distances to individual objects or points are determined. According to the invention, such a range finder can adopt the form of a laser range finder, for instance, determining a roughly approximated distance by sending a laser pulse through the signal sending unit 18c and receiving the laser pulse reflected by the target through the receiving unit 18d. To this end, the range finder particularly is characterized by a significantly larger laser beam aperture angle when compared to the angle of the measurement radiation so that the target is hit by the light of the range finder 19. According to the invention, the roughly approximated distance 19D is calculated based on the signal measured variable difference. For instance, when using the time of flight of the signal, a direct time-of-flight measurement method is suitable for the above; when using the signal phase, an indirect time-of-flight measurement method is suitable for the above, and when using the signal strength, an analysis based on RSSI values is suitable for the above, distances are assigned to particularly upon completion of the calibration, e.g. based on a function determined via least squares adjustment. The roughly approximated distance 19D forms a second piece of target position information. From a geometrical perspective, the target position is defined to a line 29b of the circle around the laser tracker having the radius 19D, whereby center of the circle and distance 19D may refer to a zero point of the range finder 18, as illustrated in FIG. 3f, for instance. According to the invention, the roughly approximated position of the reflector 81 thus results from a geometrical structure, taking into account a known distance between the range finder 19 and the camera

24, as section of a straight line, representing the target direction 29a, with circle line 29b.

According to the invention, known target positions can be used alternatively to develop a look-up table and to store this table in the laser tracker, where average picture positions $\overline{X}$ and the roughly approximated distance values 19D are assigned to the underlying target (roughly approximated) positions and, when the seeking functionality is executed, the roughly approximated position is looked up in the referenced look-up table based on the values of $\overline{X}$ and R, instead of calculating a roughly approximated position based on the target direction 29a and the roughly approximated distance 19D.

For reasons of simplification, increasing the accuracy, or acceleration, a target direction 29a may be determined prior to determining the roughly approximated distance 19D according to the invention, whereby this can be taken into account for distance determination by selecting one direction the measurement signal 18a is emitted to based on the target direction 29a. This permits to specify the area more specifically where the target 81 is located, whereby a means for target distance determination 18 with a smaller field of view, i.e. with a less divergent measurement signal, can be used, for instance, which, as a consequence, can require less space or be characterized by a higher measurement accuracy, for instance. If the means for target distance determination 18 is developed in such a way that a large number of raw distance data is generated within a large field of view, e.g. as a means for creating 3D pictures, the selection of raw data to be analyzed can be limited by using the target direction 29a, which results in shorter analysis times, for instance.

Figure 3G:
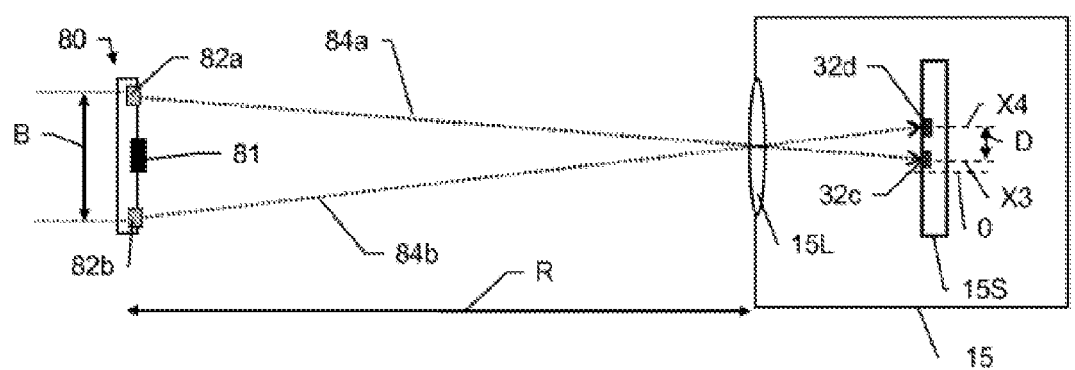
Figure 3H:
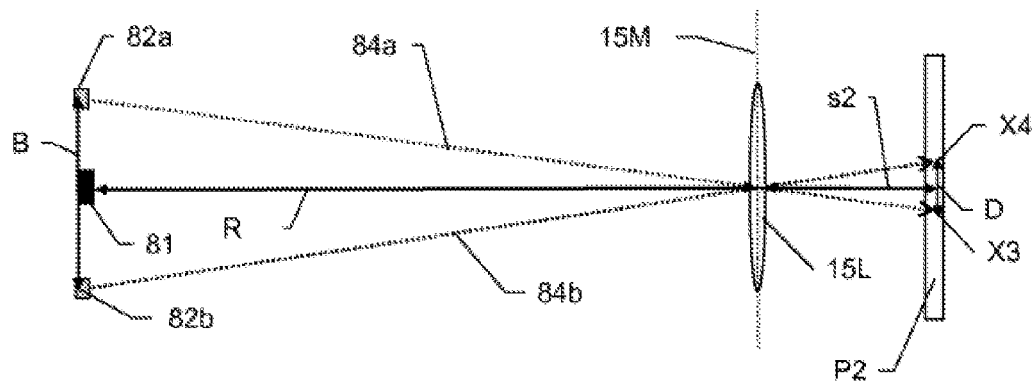

FIGS. 3g and 3h illustrate the beam path for a target-seeking unit of an embodiment of a laser tracker according to the invention, where active optical triangulation is used for finding the target 80, and an example for a geometrical target position determination based thereon. Within the framework of the example, the base B is defined by the distance of two optical marks 82a and 82b on the target 80.

In FIG. 3g, the auxiliary measuring tool 80 that is located at an unknown distance R to the laser tracker, is represented schematically in a top view, that is a carrier of the target 81 and two optical marks 82a and 82b in a known layout relative to the target 81, through the mutual distance of which a basic length B is defined. These are designed as LEDs emitting a radiation 84a and 84b, respectively, particularly differing from the illumination radiation 28a and 28b, for instance on the basis of a different wavelength. Alternatively, the optical marks may be designed as retro-reflectors reflecting light emitted by the laser tracker to the laser tracker. The radiation 84a and 84b is acquired by a picture acquisition unit 15 of the laser tracker and mapped to a position-sensitive sensor 15S by a lens 15L of the picture acquisition unit 15. In addition to the first and the second light spots created by the illumination radiation 28a and 28b of the two means of illumination 25a and 25b (see FIG. 2c), a third light spot 32c and a fourth light spot 32d are created by the aforementioned, the position of which is determined in a picture as picture positions X3 and X4, respectively, referring to a picture zero point 0. Alternatively, it is also possible to only determine one picture position X3 or X4 or a joint average picture position based on both light spots according to the invention. Furthermore, a piece of distance information is determined regarding the distance of the two light spots, distance D within the framework of the example, resulting from the two picture positions X3 and X4.

The process of finding the target 81 by determining its roughly approximated position is illustrated exemplarily in FIG. 3h for the embodiment according to the invention pursuant to FIG. 3g. The optical marks 82a and 82b are acquired by the lens 15L of the picture acquisition unit in a position X3 and X4, respectively, in picture P2, with the known distance s1 to the middle level 15M of lens 15L. This corresponds to mapping the basic length B to a distance D between the two picture positions, whereby the two LEDs 82a and 82b (and the target 81) are characterized by the distance according to the roughly approximated distance R to the target to be determined in z-direction to the center of the lens 15L. According to the invention, this distance R is determined according to basic geometrical principles (e.g. theorem of intersecting lines, trigonometry), for example using triangulation methods applying the distance length D, the basic length B, and distance s2. Together with a target direction, for instance, determined on the basis of the picture position of the first or second light spot or on the basis of a summary of the determined picture position, this is used to determine an unambiguous roughly approximated position of the target 81. According to the invention, known target positions can be used alternatively in order to develop a look-up table and to store it in the laser tracker, where picture positions are assigned to the underlying target (roughly approximated) positions and, when executing the seeking functionality, the roughly approximated position is looked up in the referenced look-up table based on the positions on the camera detector and the sensor 15S, instead of calculating a roughly approximated position based on the picture positions X1 to X4 using the roughly approximated distance and the target direction.

Regarding an active optical triangulation with a basic length B that is defined by the distance of two means of illumination of the target-seeking unit, analogous beam paths result, as illustrated in FIG. 3b, resulting from FIG. 3a, whereby, instead of the variables described above, the distance D from the distance of the first and second picture positions X1 and X2 of the two illuminants, the distance s of the camera detector and picture, respectively, and the mentioned basic length are used for triangulation. If the basic length B is defined by the distance of a means of illumination to the projection center of a camera, radiation 84a corresponds to the radiation emitted by the means of illumination to the target, and radiation 84b corresponds to the radiation reflected by the target and acquired by the camera. Triangulation is performed using the basic length B and the two beam directions.

The FIGS. 4a-d illustrate additional embodiments of a laser tracker according to the invention. All embodiments share the characteristic that they are equipped with a base 40, positioned on a tripod 45 and defining the pivot axis 41, and a support 30, positioned on the base 40, defining a tilt axis 31, pivoting around the pivot axis 41 relative to the base 40 in a motorized manner with a handle. Furthermore, a targeting unit 20 is designed for all three implementations, whereby this targeting unit 20 can be pivoted around the tilt axis 31 relative to the support 30 in a motorized manner and is equipped with a telescopic unit for precisely determining a distance to a target with the help of the measurement radiation. The beam deflecting unit 20 additionally is equipped with a vario-camera with a vario-camera lens 22 and a lens 23 that is assigned to a distance measuring and tracking unit positioned within the beam deflecting unit 20, whereby the lens 23 is used in order to emit a measurement laser beam from the distance measuring and tracking unit for precisely determining a distance to a target and for tracking the target. As part of a target-seeking unit, all embodiments are equipped with a camera 24 with a camera lens defining an optical axis and a position-sensitive detector, and furthermore with a first means of illumination 25a and a second means of illumination 25b, which are designed as LEDs and particularly emit divergent light with a dynamically variable intensity in the infrared range during operation. The camera 24 is designed to acquire specifically the light of the means of illumination 25a and 25b, which is why it is equipped with a filter unit essentially only permitting the passage of infrared light, particularly with the wavelength of the illumination radiation, to the detector. The two means of illumination 25a and 25b are positioned symmetrically around the optical axis.

Figure 4A:
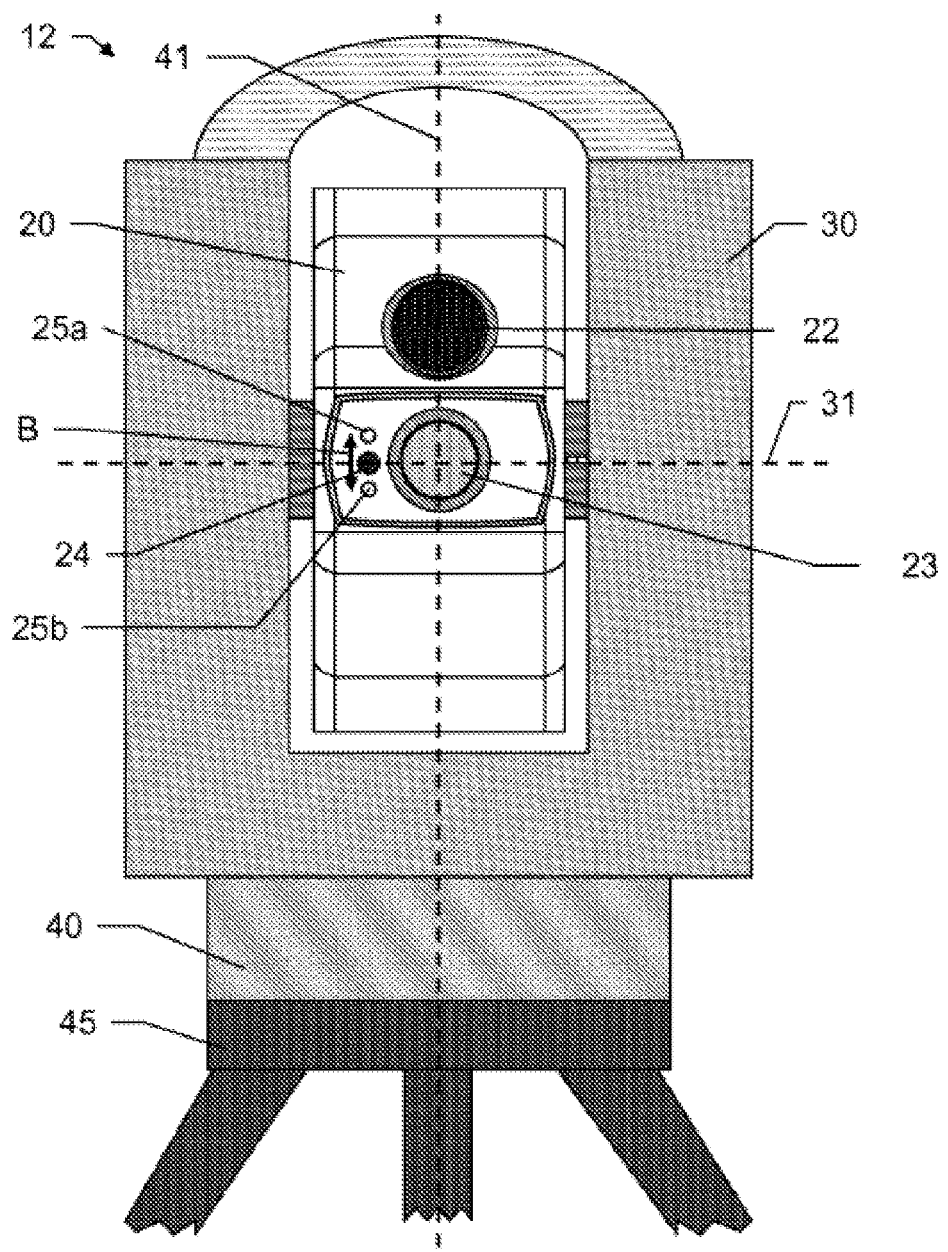
FIGS. 4a-d illustrate four additional embodiments of a laser tracker according to the invention.
Figure 4B:
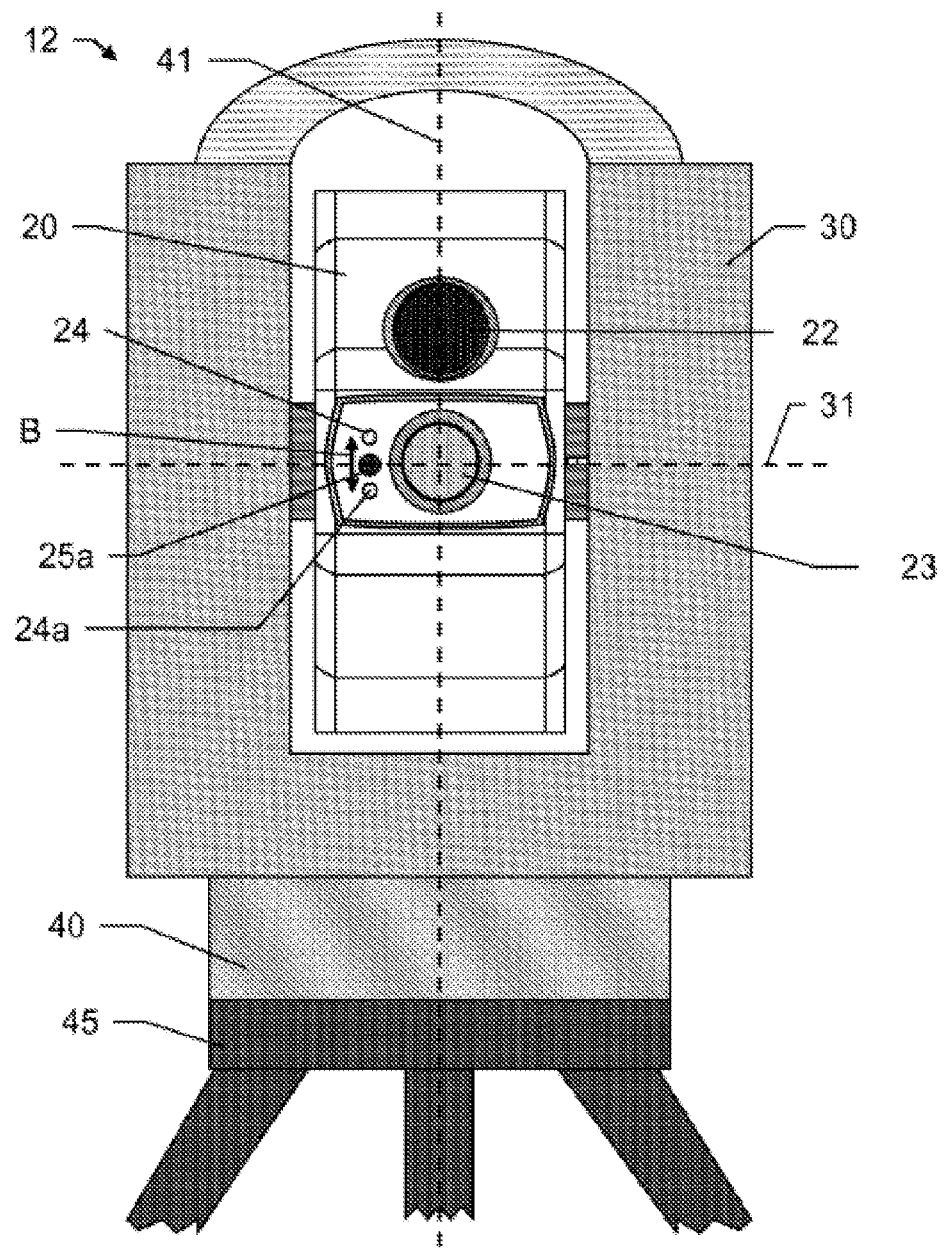
Figure 4E:
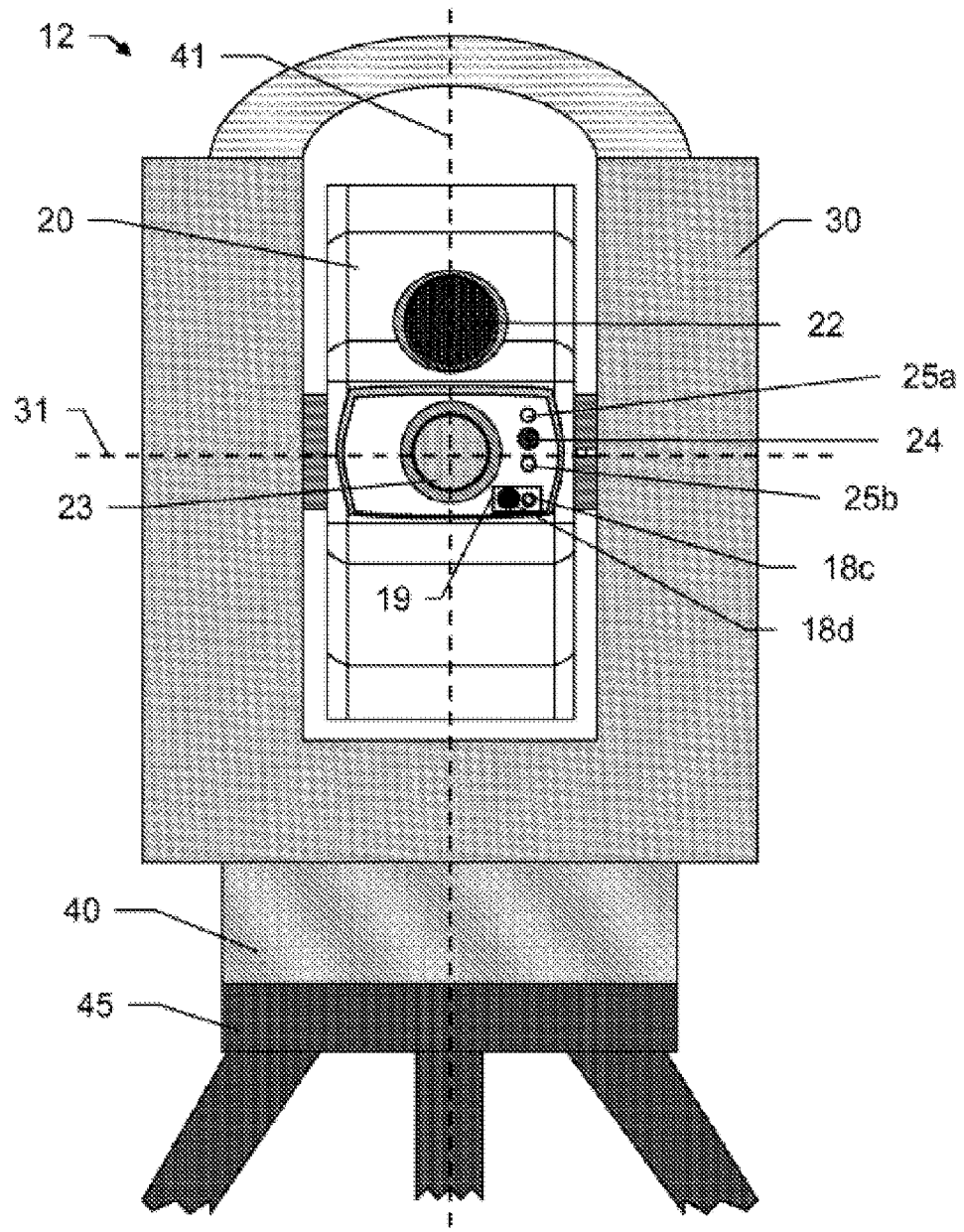

Regarding the embodiment pursuant to FIG. 4a, the distance of the two means of illumination 25a and 25b to one another defines a basic length B. Using these means of illumination, 25a and 25b a target, e.g. a reflector, can be illuminated and at least a part of the radiation may be reflected back towards the laser tracker 12 and the camera 24, respectively, by the reflector. The reflected light is then acquired with the camera 24 and mapped to the position-sensitive detector as light spot using the camera lens. The illumination radiation of the means of illumination 25a creates a first light spot; the illumination radiation of the means of illumination 25b creates a second light spot, the positions of which are determined individually or as a joint value in a picture acquired by the camera 24. Additionally, a piece of parallax correction information is determined on the basis of the light spots, e.g. by determining an extension of the light spots referring to one another and an extension of their joint radiation cross-sectional form, respectively, whereby a piece of information depending on the distance of the light spots is present. Taking into account the basic length as distance of the two means of illumination 25a and 25b to one another and the orientation and position of the detector, a roughly approximated position of the target is determined by means of the above, e.g. with the help of a mathematic-geometrical triangle structure. Thus, unambiguous finding of the target is possible in such a way that, despite the offset between the camera 24 and the lens 23, the measurement radiation can be directed towards the target in one step. In particular, the given data and the data determined by the target-seeking unit can be used to calculate a roughly approximated distance to the target that, together with a target direction determined on the basis of one or both light spot positions, is used for determining the roughly approximated position of the target and/or for determining a direction from the laser tracker to the target. For instance, the intersection of the two axes 31 and 41 is used as the starting point of the direction to the target, the position of which relative to the optical axis of the camera or detector position is known.

Alternatively (FIG. 4b), the target-seeking unit, instead of two means of illumination 25a and 25b, is equipped with only one means of illumination 25a (or 25b) and, instead of a camera 24, with two cameras 24 and 24a that are positioned symmetrically around the means of illumination 25a and the distance of which (as distance of the two optical camera axes) to one another defines the basic length, in order to determine a picture position and a piece of parallax correction information based on reflected illumination radiation. The first and the second light spot, forming the basis for determining the roughly approximated position of the target as described above, are created by the two cameras each projecting one part of the reflected illumination radiation of the means of illumination 25a as first and second light spot, respectively, to the position-sensitive detector(s) so that the light spots are acquired in a common or two individual pictures.

In the embodiment pursuant to FIG. 4c, the means of illumination 25a and 25b can be used to illuminate a target, e.g. a reflector, and to reflect at least a part of the radiation through the reflector towards the laser tracker 12 and towards the camera 24, respectively. The reflected light is then acquired by the camera 24 and mapped to the position-sensitive detector as a light spot with the help of the camera lens. The position of the captured illumination radiation on the detector is used to determine a piece of target position information, particularly a target direction. In order to unambiguously find the target, the target-seeking unit according to the invention is furthermore equipped with a range finder 19, with a known position on the targeting unit 20, which is equipped with a signal sending unit 18c and a signal receiving unit 18d. For instance, the range finder 19 may be designed as a laser range finder determining a roughly approximated distance to the target by measuring the time of flight of a laser pulse emitted by the sender 18c, reflected by the target, and registered by the receiver 18d, e.g. with the help of an Avalanche Photo Diode (APD), according to the direct time-of-flight principle. Accordingly, radar, lidar, ultrasound, or radio range finders are suitable according to the invention in order to determine the distance between laser tracker and target. The latter may build upon ultra-wideband, Bluetooth, or WLAN technology or the like, e.g. using the IEEE 802.11 standard. The field of view of a range finder according to the invention is large, when compared to the field of view of the fine targeting detector, for instance, the aperture angle of the measurement radiation of the laser range finder may be at least one degree. In this, the measurement signal can be acquired by a signal sending and receiving unit positioned at the target, instead of being reflected by the target, and therefore the process of sending an equivalent measurement signal can be triggered and thus the measurement signal can be returned to the range finder. In particular when using the time-of-flight of the signal for determining the distance, the time between receiving and sending required by the target may be taken into account within the framework of analysis. For this, a referenced average time is stored within the control and evaluating unit, for instance. When determining the distance using the signal strength, this is not necessary. Specifically when using light as a carrier of the measurement signal, a distance can be determined, as an alternative to the direct time-of-flight method, by using the indirect time-of-flight principle according to the invention, i.e. by analyzing a modulated wave regarding its phase.

According to the embodiment pursuant to FIG. 4d, the means of illumination 25a and 25b can be used to illuminate a target each, e.g. a reflector, and at least a part of the radiation can be reflected by the reflector towards the laser tracker 12 and towards the camera 24, respectively. The reflected light is then acquired as light spots using the camera 24 in one picture. The position of the acquired illumination radiation on the detector in the picture, for instance resulting from averaging both light spot positions of the first and the second means of illumination, is used to determine a first piece of target position information, e.g. a target direction.

In order to unambiguously find the target, a unit 46 for determining a distance to the target with the help of active optical triangulation is furthermore positioned at the targeting unit 20 as part of the target-seeking unit according to the invention. For this, the unit 46 that may, for instance, be designed as a strip projection scanner, is equipped with a third means of illumination 47 and a second camera 48 with a second position-sensitive detector, the distance of which to one another, particularly the distance of the projection center of the second camera 48 to the center of the third means of illumination, defines the triangulation basic length B. The third means of illumination 47 can emit illumination radiation in a directed manner, wherein the emission direction can be acquired, and is designed as laser diode, for instance, particularly as IR laser diode. In order to differentiate the individual illumination radiations, the wavelength and/or polarization or any other characteristic of the light emitted by the laser diode may be definedly different from the light of the first and the second means of illumination 25a and 25b. When executing the seeking functionality, active optical triangulation is performed as a result of radiation reflected by the target, which is emitted by the means of illumination 47 in a directed manner, being acquired by the detector of the second camera 48 and the position on the detector of the light spot created as a result being determined. The projection center of the camera 48 and the light spot position on the detector define a beam receiving direction; the emission direction defines a second direction connected to the center of means of illumination 47. The illuminated target is the common point of both directions and a corner point of a triangulation triangle. The two other points of the triangle constitute the end points of basic length B, i.e. the projection center of the second camera 48 and the center of the third means of illumination. If the position and orientation of the camera 48 and the third means of illumination 47 are known, this can be used to determine a second piece of target position information, e.g. based on a simple geometrical structure or trigonometric calculation. According to the invention, active optical triangulation is used in particular in order to determine a distance to the target. Together with the first piece of target position information, this is used according to the invention to determine a roughly approximated position of the target, whereby it is possible to direct the distance measuring and tracking unit to the target in one step.

Instead of an individual second camera 48, the unit 46 can include two or more second cameras 48 and/or several means of illumination 47 for emitting directed illumination radiation, with the distance of a means of illumination to the camera defining a triangulation base in each case.

Instead of a second camera 47, the first camera 24 can be designed in such a way that directed illumination radiation that can be acquired can be separated from other illumination radiation that can be acquired, in particular with the help of an optical filter, a filter algorithm used for analyzing a detector picture, or by the presence of several detectors or detector elements sensitive for different lights. According to the invention, the third means of illumination 47 can be suitable for illuminating the target in a structured manner, e.g. by the unit 46 being designed as a light structure 3D scanner. Furthermore, any other state-of-the-art means are suitable that can be used to determine a distance to the target with the help of active optical triangulation and which a base is defined for by the distance of a means of illumination to a camera assigned to this means of illumination.

The FIGS. 5a-c each illustrate another embodiment of a targeting unit 20 according to the invention of a laser tracker. The targeting units 20 in turn can be pivoted around a tilt axis relative to a support 30 and are equipped with a lens 23 of a telescopic unit for emitting a measurement radiation and for precisely determining a distance to a target with the help of the measurement radiation.

In FIGS. 5a and 5b, the targeting units 20 are each characterized by more than two means of illumination. In the event of an even number of means of illumination 25a to 25f, a basic length B1, B2 and B3, respectively, is defined in each case by a distance of one pair of means of illumination 25a/b, 25c/d, 25e/f to one another, with the basic lengths differing regarding their length. The means of illumination 25a-25f are positioned in pairs symmetrically around the optical axis of a camera 24a or 24b. As a matter of principle, the target-seeking unit of the respective laser tracker pursuant to FIG. 5a or 5b is configured in such a way that a respective pair of first and second means of illumination, e.g. 25a and 25b, can be used alone to find the target, without the need of relying on any additional illumination with the help of a third and a fourth illuminant, e.g. 25c, 25d. Since different basic lengths affect the accuracy of the process of finding the target and the minimum size of a target, at which it can still be found, the presence of several pairs of means of illumination 25a/b, 25c/d, 25e/f with different distances makes sure that higher levels of accuracy regarding the process of finding the target and/or targets with different sizes can be achieved.

A relatively long basic length, e.g. B3, allowing for a comparatively high accuracy, is used to find a relatively large target, and the relatively short basic length B1 is used to find a relatively small target, the detector is not capable of acquiring any retro-reflected illumination for anymore due to the relatively large distance of the means of illumination 25a to camera 24a, since illumination radiation reflected in such a way is guided past the optical inlet aperture of the camera 24a. In this, a second pair of means of illumination consisting of a third and a fourth means of illumination, e.g. 25c, 25d in FIG. 5b, can be used as an alternative to a first and a second means of illumination, e.g. 25e, 25f in FIG. 5b, in order to illuminate the target, e.g. if the size of the target is already known; otherwise, in addition to a first and a second means of illumination. In general, an additional use can also be performed according to the principle of multiple measurement in order to increase the accuracy of a measurement method, finding the target in this case, e.g. if the target is suitable for several basic lengths. As an alternative to the arrays of more than two means of illumination illustrated, different basic lengths can also be implemented only through a first and a second means of illumination according to the invention, the position of which on the targeting unit can be changed.

In order to render distinguishable the illumination radiation of the individual means of illumination 25a to 25f for finding the target, particularly in order to be able to separate light spots overlapping (that would overlap) on the position-sensitive detector, illumination can be performed according to the invention by only one of the means of illumination 25a to 25f in each case, i.e. when executing the seeking functionality, a (short) illumination sequence can be performed. Alternatively, the means of illumination 25a to 25f can be designed to emit illumination radiation with differing characteristics. For instance, the means of illumination 25a emits light of a first color; the means of illumination 25b emits light of a second color, etc. Accordingly, the cameras 24a, 24b provide options for light separation, e.g. through optical filters that can be switched into the beam path, several different wavelength-sensitive detectors, or wavelength-specific analysis of a detector picture. In particular, in order to be able to independently determine the positions of the light spots, created by a single pair of means of illumination 25a/b, 25c/d or 25e/f, even in the event of using identical illumination radiation not distinguishable with regard to its characteristics and simultaneous illumination, a detector picture of a laser tracker according to the invention, within the framework of which the first and the second illumination radiation is acquired by the first means of illumination 25a and by the second means of illumination 25b, can be analyzed according to the invention in such a way that segmentation of the individual illumination radiation cross-sectional forms is performed. Since the cross section of an illumination beam normally is largely circular, two individual circular shapes are segmented in particular, which, for instance, may be performed with the help of Circular Hough Transformation (CHT) or scale-invariant kernel operators, whereby a previously known diameter of the two illumination beams can be taken into account. As an alternative to such a picture analysis, a stored sample, which, for instance, is stored in the control and evaluating unit and represents two overlapping light spots, can be matched with the acquired light spots using a best-fit method according to the invention, and the position of the harmonized sample can be used to determine a first and a second light spot position of the light spot created by the first and the second means of illumination. Such an approach particularly allows for determining positions with sub-pixel accuracy.

As an alternative complementary solution, the targeting unit 20 is equipped with pairs of cameras or camera lenses each defining one basic length B1-B3 as optical mapping units positioned symmetrically at a means of illumination 25a and 25c, respectively, analogous to the complementary solutions described in FIGS. 2a, 3a-d, and 4a, instead of paired means of illumination 25a-25f, each of which is grouped around a camera 24a, 24b. In this, the respective pairs of cameras are positioned at a distance to the respective means of illumination 25a and 25c, respectively, that reflected illumination radiation of the respective means of illumination can be acquired by both cameras of a pair of cameras, with the pairs of cameras differentiated by the distance to one another being used for different distances to the target and for finding targets of different sizes, respectively, and several pairs of cameras being used, if required, in order to increase the accuracy. When using a joint detector for one or several pairs of cameras pictures are recorded sequentially or wavelength-specific filters are used at the optical mapping units and wavelength-dependent analysis is used as well optionally analogous to the approach described in the paragraph above, in order to be able to separate light spots overlapping (that would overlap) on the position-sensitive detector. Analogous to using a non-stationary means of illumination instead of paired means of illumination as described above, a non-stationary camera and camera lens, respectively, can be used instead of a pair of cameras in each case.

In the embodiment pursuant to FIG. 5a, a separate camera with a position-sensitive detector is assigned to one pair in each case; camera 24a to pair 25a/b, camera 24b to pair 25c/d. Alternatively, several or all pairs of means of illumination can be assigned to one camera. A respective light spot position can be determined as a picture position on the detector of the camera 24a or 24b, created by the illumination radiation of a means of illumination 25a-25d, independent of any other light spot position. In addition to a single light spot position, its distance to the position of a light spot is determined that is caused by the second means of illumination of a pair 25a/b, 25c/d. When executing the seeking functionality, the process of finding the target is performed using at least one picture position of at least one pair of light spots depending on their distance to one another, e.g. as described regarding FIG. 3b.

Regarding the laser tracker pursuant to FIG. 5b, any illumination radiation is acquired by the detector of the camera 24a. Consequently, any basic length B1, B2, or B3 is mapped to the same position-sensitive detector when illuminating the target, e.g. a retro-reflector, with the help of one of the pairs of means of illumination 25a/b, 25c/d or 25e/f. Alternatively, there may be a separate camera for every individual pair of illuminants. The picture length depending on the underlying basic length B1-B3 and the target distance, together with the respective previously known basic length B1, B2, or B3, forms the basis for active optical triangulation, on the basis of which the target is found according to the invention when executing the seeking functionality.

In FIG. 5c, the targeting unit is equipped with a camera 24 with a position-sensitive detector for finding the target and with the means of illumination 25 for determining a target direction by analyzing a position on the position-sensitive detector of the camera 24 determined on the basis of the illumination radiation. Furthermore, the targeting unit is equipped with a range finder for finding the target used to send an electromagnetic signal as means for target distance determination, designed as a means for creating a 3D picture 45, which is a range picture camera (RIM camera) in the specific embodiment. The RIM camera is equipped with a lens 45a and means of illumination 45b as well as a RIM detector that can be used for acquiring ambient points in a three-dimensional manner, e.g. a CMOS time-of-flight range picture sensor with Current Assisted Photonic Demodulation (CAPD) or a Photogate Photonic Mixer Device (PG-PMD). The means of illumination 45b are used to illuminate a part of the environment of the laser tracker, where particularly the target is located or assumed to be located, and the reflected radiation guided by the lens 45a to the RIM detector is used to create a 3D cloud of points of the ambient area, representing spatial position information of a large number of ambient points, including particularly a piece of position information regarding the target. In this, the means of illumination 45b and the RIM camera particularly work using light having a wavelength differing from the illumination radiation of the means for target direction creation from the camera 24 and the means of illumination 25, whereby it is possible to determine target direction and roughly approximated distance without any mutual impairments. In a specific embodiment, the targeting unit can be equipped with one camera only that is designed both for acquiring the illumination radiation of the means of illumination 45b and the illumination radiation of the means of illumination 25, and this single camera is used for range imaging. Alternatively, a laser tracker according to the invention can be equipped with an RIM camera for finding the target with range imaging with the help of microwave radiation or ultrasound. Based on the data acquired by the RIM camera 45, the distance of the point in the 3D cloud of points located, at least approximately, in the previously determined target direction can be adopted as the roughly approximated distance. Alternatively, the target object may be recognized, according to the invention, with the help of a brightness analysis of the RIM picture or based on the cloud of points and a depth picture created thereof, respectively, with the help of object recognition, and the target roughly approximated distance can be determined as the distance of a point representing the target object acquired directly or calculated. The target direction and the target roughly approximated distance are used to create a target roughly approximated position according to the invention, whereby the target has been found unambiguously.

Figures 6A, 6B:
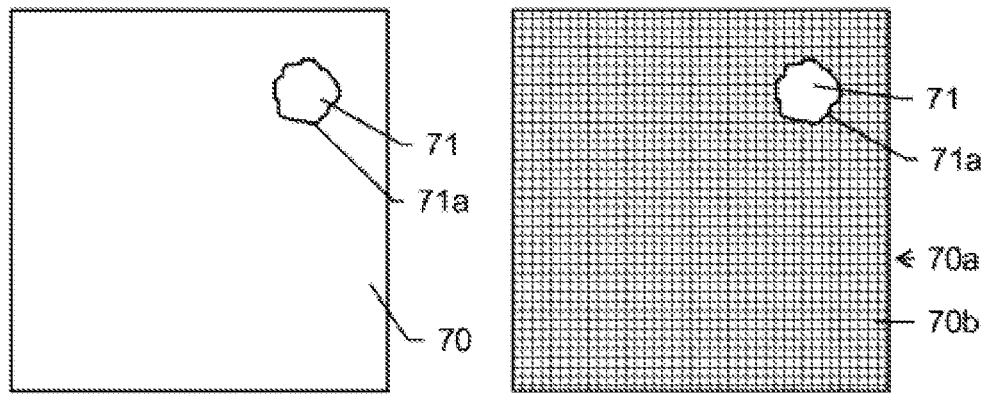
FIGS. 6a-c illustrate a picture acquired with a camera of a laser tracker according to the invention using a position-sensitive detector and a method for determining the respective target position.

FIG. 6a illustrates a picture 70 acquired with a camera of a laser tracker according to the invention with a position-sensitive detector with a light spot 71 acquired in the picture, which was created by radiation that was reflected by an illuminated target or emitted or reflected by an optical mark at the target. According to the cross-sectional form of the radiation, light spot 71 is represented by a radiation cross-sectional form 71a in the picture 70, the position of which can be determined as the light spot position according to the invention. In this context, FIG. 6b illustrates the position of the illuminated light on the position-sensitive detector 70a of the camera. As a light spot, the radiation hitting the detector 70a covers numerous individual sensor pixels 70b, whereby the form of the radiation can be determined depending on the size and the number of sensor pixels 70b.

In order to determine the position of the radiation cross-sectional form 71a on the sensor 70a and in the picture 70, respectively, an analysis based on picture processing can be performed in such a way that the light spot position representing the position of the radiation in the picture is determined with the help of this analysis. To this end, the control and evaluating unit of the laser tracker is characterized by a picture position determination functionality according to the invention that, when being executed, permits to determine the position of the radiation with the help of picture processing in such a way that the radiation position represents a position in the picture 70 of the radiation cross-sectional form 71a acquired in the respective picture 70. In particular, this can be performed using a center of gravity calculation on the basis of the radiation cross-sectional form 71a acquired in the respective picture 70, particularly with the help of a brightness and/or contrast analysis.

Figure 6C:

Alternatively or additionally, the position can be determined—as illustrated in FIG. 6c—by matching, particularly harmonizing, the radiation cross-sectional form 71a acquired in the respective picture with a stored sample 72 (here: circular shape) based on a best-fit method, particularly with sub-pixel accuracy, with the respective position of the radiation acquired in the picture being determined on the basis of the harmonized position of the sample 72 in the picture, particularly with sub-pixel accuracy.

In particular, a piece of information permitting to derive a sample-internally defined sample position to be used when finally determining the light spot and picture position, respectively, can be stored for the stored sample within the sample in this, specifically whereby the piece of information is the sample-internally defined sample position or a defined sample position determination algorithm, such as a sample center of gravity determination algorithm.

As a consequence, if the sample 72 has been adapted to the form of the acquired radiation, a determined point—regarding the circular shape illustrated here the center of the circle, for instance—can be derived as picture position to be determined in picture 70 and on the sensor 70a, respectively, due to the already stored sample characteristics. In this, the sample 72 can also be defined as ellipse or polygon, for instance.

If, within the framework of the picture 70, a light spot consists of the radiation of several means of illumination or optical marks, a picture position determination functionality can be present according to the invention in such a way that, analogous to the approach described above, e.g. with the help of center of gravity calculating picture processing and/or matching, a stored sample representing an overlap is used to determine the positions of the individual light spots.

Figure 6D:
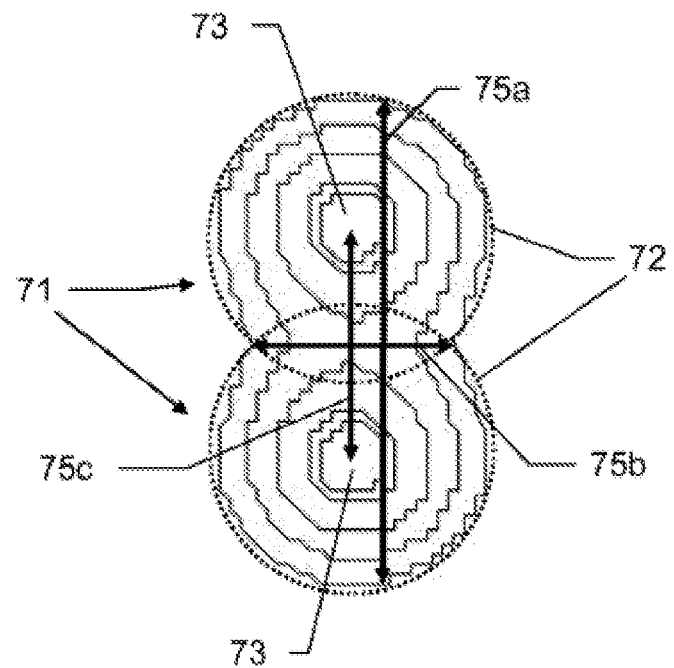

FIG. 6d illustrates two light spots 71 acquired in a picture 70 of a camera with a position-sensitive detector of a laser tracker according to the invention, created by the radiation of two means of illuminants, particularly by the illumination radiation of two means of illumination reflected by the target. The acquired radiation cross-sectional form consists of the two overlapping light spots 71, each of which is characterized by an intensity and brightness maximum 73, respectively. The radiation absorbed by the detector covers a number of sensor pixels on the detector, whereby brightness values and the shape of the radiation can be determined depending on the size and the number of sensor pixels. With the help of a functionality of the control and evaluating unit according to the invention, it is possible to execute a picture processing procedure in such a way that a separation of the light spots 71 on the sensor 70a and in the picture 70, respectively, can be determined, whereby a piece of distance information or parallax correction information can be obtained. For this, a respective picture position of each light spot 71, as described regarding FIG. 6b, can be determined and a distance 75c according to the invention can be calculated based on both positions. For instance, a brightness analysis can be used to determine the two intensity peaks 73 and used as respective picture position.

Alternatively, the brightness analysis can be used to determine the form and margins of intensity limits, respectively, of or within the radiation cross-sectional form, for instance, which can then be used to determine a characteristic geometrical size of the cross-sectional form, e.g. its longest expanse 75a or waist width 75b. Alternatively or additionally, the separation can be determined by matching, particularly harmonizing, the radiation cross-sectional form of both light spots 72 acquired in the respective picture with one or several stored samples 72 (here: overlapping circular shapes) based on a best-fit method, particularly with sub-pixel accuracy, with the harmonized position of the sample 72 in the picture being used to determine a piece of distance information or parallax correction information of the radiation acquired in the picture, particularly with sub-pixel accuracy.

In particular, a piece of information permitting to derive a piece of sample-internally defined information on the degree of separation to be used when finally determining a piece of distance information or parallax correction information, can be co-stored for the stored samples within the sample in this, specifically whereby the piece of information is the sample-internally defined distance information or parallax correction information or a determination algorithm defined accordingly.

In the example, a waist width 75b or length 75a can be calculated or determined as characteristic value for separation based on the circle line intersections based on a value stored for the appropriate circular sample, for instance, with the help of matching the circular forms 72, which may also be stored as a single, coherent sample.

Figure 7A:
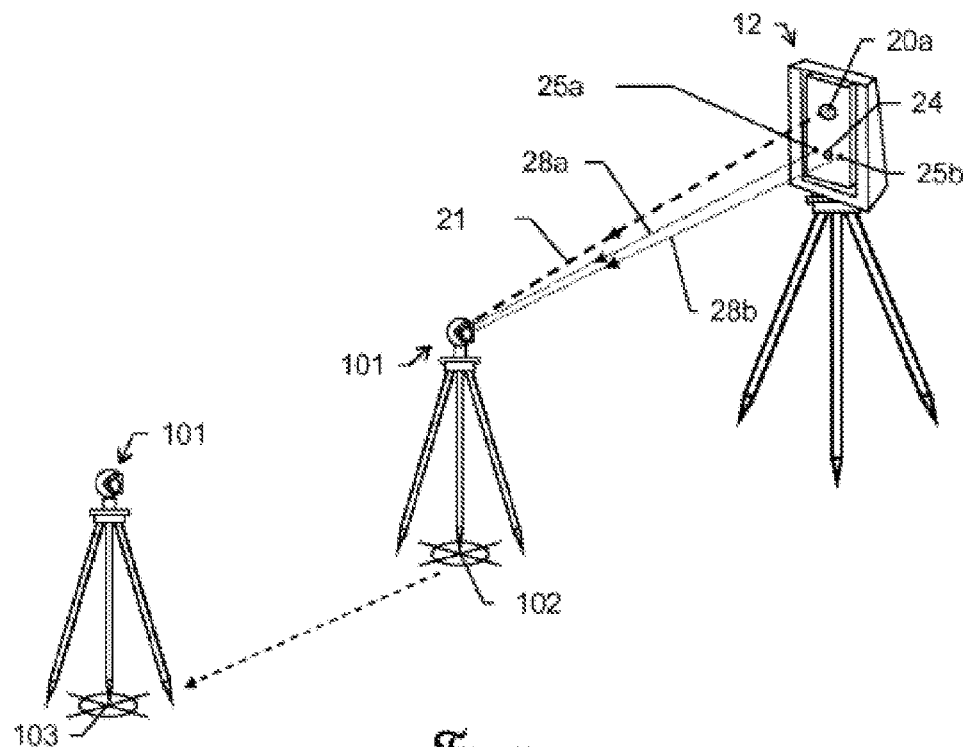
FIGS. 7a-c illustrate a calibration of position and orientation according to the invention of three embodiments of a laser tracker according to the invention.
Figure 7B:
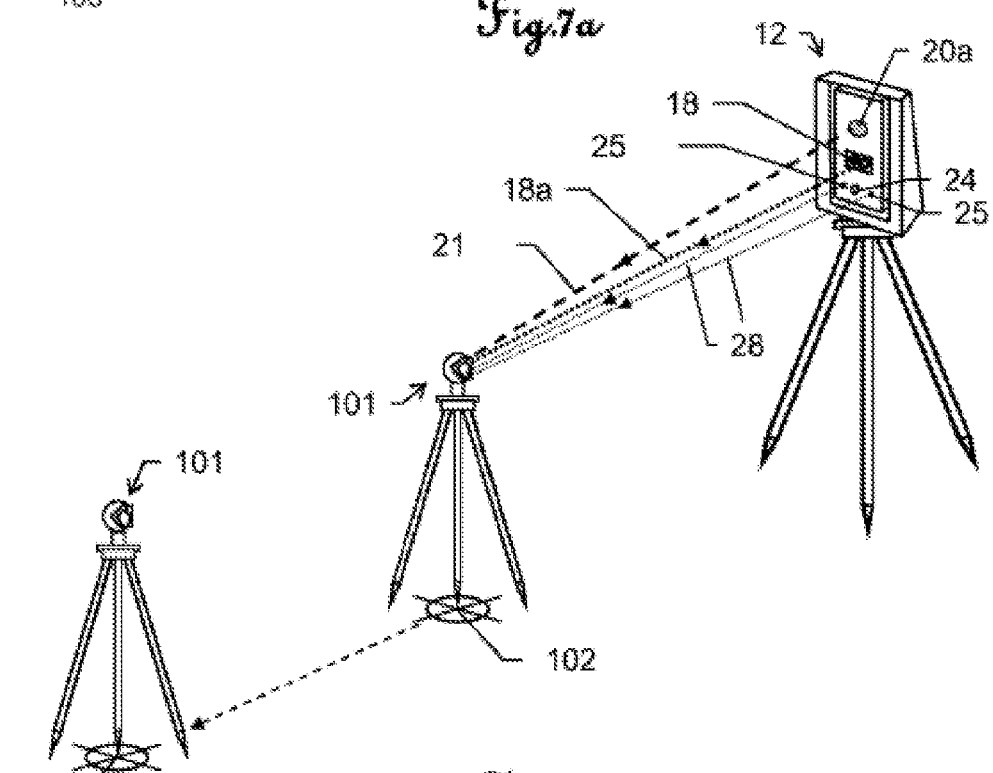
Figure 7C:
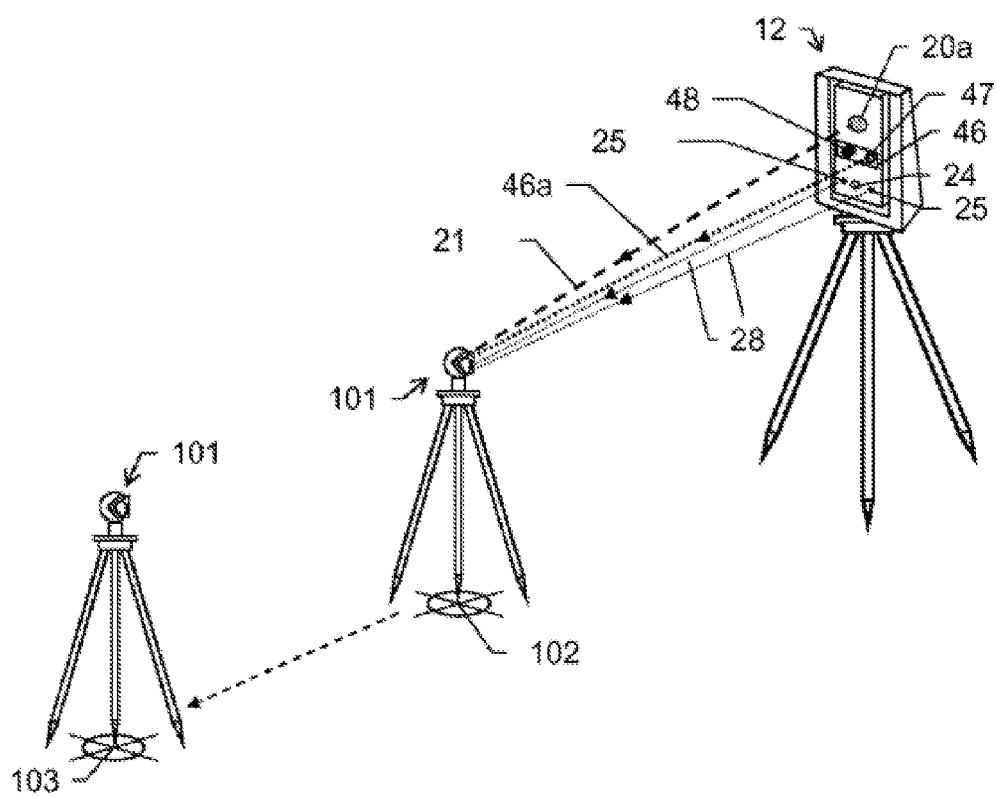

The FIGS. 7a to 7c illustrate an approach according to the invention for calibrating the position and orientation of decisive elements of the target-seeking unit regarding different embodiments of laser trackers 12 according to the invention, particularly regarding an embodiment pursuant to any of the FIGS. 1-5. The laser trackers are each equipped with a beam deflecting unit 20a for emitting a measurement radiation 21 defining a measurement axis that can be used to exactly determine the distance to the target and, by knowing the orientation of the measurement radiation 21, the position of the target 101, initially the first position 102, and then the second position 103. In this, the target-seeking unit acquires the target 101 in each case. Within the framework of a calibration process according to the invention, it is possible to determine and store device parameters not yet determined, in particular, which are then used for determining a roughly approximated position within the framework of finding a target, and/or to assign and store measured values, particularly picture positions, to roughly approximated positions, with this assignment being used for later finding the target as a look-up table or as a functional reference.

In FIG. 7a, the target-seeking unit is equipped with a camera 24 and two means of illumination 25a and 25b in this regard, with a distance to one another defining a basic length, illuminating the target 101 with light 28a and 28b. At least the position of one of the two light spots acquired by the above in a picture of the camera 24 is determined. Furthermore, their distance to one another is determined as the parallax correction information. The measuring data acquired on the basis of the aforementioned is used to calibrate the system 12 in such a way that the relative positions of the means of illumination 25a and 25b regarding the camera 24, particularly regarding its optical axis, and the camera 24 regarding the measurement axis are derived, resulting in the external orientation, referring to the coordinate system of the beam deflecting unit 20a, being determined as a consequence. Alternatively or additionally, the relative position of the means of illumination 25a and 25b regarding the measurement axis and the basic length and parameters regarding the internal orientation of the camera 24 can be determined. In this, the targeting direction for the measurement radiation 21 is known in each case and the light spot positions can be assigned to this direction in each case.

In the embodiment pursuant to FIG. 7b, the target-seeking unit is equipped with a camera 24 and a means of illumination 25 illuminating the target 101 with light 28. The position of the illumination radiation reflected by the target 101 is determined on the position-sensitive detector of the camera 24. Furthermore, the target-seeking unit is equipped with a means for target distance determination 18, e.g. an ultrasound range finder, determining a roughly approximated distance to the target 101 with the help of sending and receiving a measurement signal 18a, e.g. an ultrasonic wave. The measured data acquired with the help of the above is then used to calibrate the system 12 in such a way that the relative positions of the means of illumination 25 regarding the camera 24, particularly regarding its optical axis, and of the camera 24 regarding the measurement axis, and of the means for target distance determination 18 regarding the camera 24 and/or the measurement axis and the positions of the sending and receiving unit of the means for target distance determination 18 are derived, whereby ultimately the external orientations of these target-seeking unit components, referring to the coordinate system of the beam deflecting unit 20a, are determined. Alternatively or additionally, the relative position of the means of illumination 25 regarding the measurement axis and parameters of the internal orientation of the camera 24 and the means for target distance determination 18 can be determined. In this, the targeting direction for the measurement radiation 21 is known in each case and the position data of the units of the target-seeking unit can be assigned to this direction in each case.

In the embodiment pursuant to FIG. 7c, the target-seeking unit is equipped with a first camera 24 and a means of illumination 25 illuminating the target 101 with light 28. The position of the illumination radiation reflected by the target 101 is determined on the position-sensitive detector of the camera 24. Furthermore, the target-seeking unit is equipped with a unit 46 for active optical triangulation, for instance designed as projection depth sensory system, with a projection unit 47 for emitting radiation 46a in a directed manner, and a second camera 48, the distance of which defines the basic length for triangulation. The measured data acquired this way is used to calibrate the system 12 in such a way that the relative positions of the means of illumination 25 regarding the first camera 24, particularly regarding its optical axis, and the first camera 24 regarding the measurement axis, and the triangulation unit 46 regarding the first camera 24 and/or the measurement axis and the positions and orientation of the projection unit 47 and its emission direction, respectively, and the second camera 48, whereby ultimately the external orientations of these target-seeking unit components, referring to the coordinate system of the beam deflecting unit 20a, are determined. Alternatively or additionally, the relative position of the means of illumination 25 regarding the measurement axis and parameters regarding the internal orientation of the cameras 24 and 48 can be determined. In this, the targeting direction for the measurement radiation 21 is known in each case and the position data of the units of the target-seeking unit can be assigned to this direction in each case.

It shall be understood that these figures shown only illustrate possible exemplary embodiments in schematic representation. According to the invention, the different approaches can be combined both with each other and with methods for determining distances and/or positions and with generic state-of-the-art measuring tools, particularly laser trackers.

What is claimed is:

1. A laser tracker for continuously tracking a reflective target and for determining the position of the target, the laser tracker comprising:
   a base defining a vertical axis,
   a beam deflecting unit for emitting a measurement radiation and for receiving at least a part of the measurement radiation reflected by the target, with the beam deflecting unit pivoting around the vertical axis and a tilt axis relative to the base in a motorized manner and a measurement axis being defined by an emission direction of the measurement radiation,
   a position-sensitive fine targeting detector defining a fine targeting field of view for fine targeting and tracking the target with the help of detecting the measurement radiation reflected by the target,
   a fine distance measurement unit for precisely determining the distance to the target with the help of the measurement radiation,
   an angle measuring functionality for determining an orientation of the beam deflecting unit relative to the base and
   a target-seeking unit comprising:
      at least a first and a second illumination light with a fixed distance to one another defining a first basic length for illuminating the target with electromagnetic illumination radiation,
      a camera defining a field of view with a position-sensitive detector, wherein
         the camera, regarding its optical axis, is offset regarding the measurement axis,
         the camera can be used to acquire a picture,
         in the picture, at least a part of the illumination radiation of the first and the second illumination lights reflected by the target can be acquired as a first and a second light spot, and
      a control and evaluating unit with seeking functionality for finding the target depending on the light spots so that the measurement radiation can be directed towards the target based on finding the target, wherein when executing the seeking functionality, at least one picture position is determined depending on the first and/or the second light spot on the detector, a piece of parallax correction information is determined by picture processing the picture taken, the information taking into account a separation of the light spots and depending on a distance of the two light spots to one another, and the process of finding the target is performed using the at least one picture position and depending on the parallax correction information, so that a parallax defined by the measurement axis and the optical axis of the camera is taken into account.

2. The laser tracker according to claim 1, wherein:

the first and second illumination lights are designed in such a way that the electromagnetic illumination radiation can be emitted divergently with a wavelength in the infrared range, with the first and second illumination lights being designed as light-emitting diodes for emitting light with a wavelength in the infrared range, the intensity of the illumination radiation being dynamically variable, and/or the camera being designed in such a way that essentially only infrared illumination radiation can be acquired, specifically with the camera being equipped with a filter, especially for the essentially exclusive transmission of the infrared radiation to the position-sensitive detector.

3. The laser tracker according to claim 1, wherein:

the target-seeking unit is equipped with at least a third and a fourth illumination light with a basic length differing from the first basic length, used instead of the first and the second illumination lights or in addition to these for illuminating the target, with the illumination lights to be used being selected depending on the known nature of the target when the seeking functionality is executed.

4. The laser tracker according to claim 1, wherein:

an overlap of the illumination radiation cross-sectional forms of the first and the second illumination lights, acquired in a picture of a camera, impairing a separate picture position determination depending on the respective light spot, is avoided or resolved by the process of illuminating the target by the first and the second illumination lights and the process of acquiring a single light spot position created by the above being performed at different times when executing the seeking functionality, the first and the second illumination lights each being capable of emitting illumination radiation of different wavelengths and/or polarization, separable by the camera, with the help of filters, the individual cross-sectional forms being segmented by picture processing the picture, using edge detection, segmenting circular shapes, circular shapes with a defined diameter or diameter interval, specifically using Circular Hough Transformation (CHT) or scale-invariant kernel operators, and/or matching the light spot form acquired in the picture from the overlapping individual illumination radiation cross-sectional forms with a stored sample based on a best-fit method, with sub-pixel accuracy, with the respective individual light spot position of the illumination radiation of the respective illumination light acquired in the picture being determined on the basis of the harmonized position of the sample in the picture, with sub-pixel accuracy, with at least one, especially, two pieces of information being co-stored for the stored sample that permits to derive sample-internally defined sample positions to be used for finally determining the respective light spot position within the sample, specifically with the information being the sample-internally defined sample position or a defined sample position determination algorithm.

5. The laser tracker according to claim 1, wherein:

the laser tracker includes a calibration functionality, during the execution of which a referenced assignment of picture positions and parallax correction information to roughly approximated positions of the target is developed and stored and/or the known position of the first and second illumination lights relative to the optical axis and/or measurement axis and/or the fixed basic length of the first and second illumination lights and/or the known position of the optical axis relative to the measurement axis are determined, with, when executing the calibration functionality, the fine distance measurement unit targeting and measuring a target provided in different positions with the help of the measurement radiation, for every position of the target the at least one picture position being determined, and the measurement of the target and the at least one picture position and parallax correction information determined in this regard being used to derive the relative positions of the first and second illumination lights regarding the measurement axis and the basic length.

6. The laser tracker according to claim 1, wherein:

the control and evaluating unit includes a picture position determination functionality, during the execution of which a picture position is determined with the help of picture processing in a picture acquired by the camera in such a way that the picture position represents the position in the picture of an illumination radiation cross-sectional form acquired in the picture, with the help of center of gravity calculation on the basis of the light spot form acquired in the picture, with the help of a brightness and/or contrast analysis, and/or by matching the illumination radiation cross-sectional form acquired in the picture with a stored sample based on a best-fit method, with sub-pixel accuracy, with at least one picture position of the illumination radiation acquired in the picture being determined on the basis of the harmonized position of the sample in the picture, with sub-pixel accuracy, with one piece of information being co-stored for the stored sample that permits to derive sample-internally defined sample positions to be used for finally determining the picture position within the sample, specifically with the information being the sample-internally defined sample position or a defined sample position determination algorithm, such as a sample center of gravity determination algorithm, for instance.

7. Laser tracker for continuously tracking a reflective target and for determining the position of the target with a base defining a vertical axis, a beam deflecting unit for emitting a measurement radiation and for receiving at least a part of the measurement radiation reflected by the target as reflected illumination radiation bundle, with the beam deflecting unit pivoting around the vertical axis and a tilt axis relative to the base in a motorized manner and a measurement axis being defined by the emission direction of the measurement radiation,
a position-sensitive fine targeting detector defining a fine targeting field of view for fine targeting and tracking the target by detecting the measurement radiation reflected by the target,
a fine distance measurement unit for precisely determining the distance to the target with the help of the measurement radiation, and
an angle measuring functionality for determining an orientation of the beam deflecting unit relative to the base, wherein:
a target-seeking unit with
at least a first illumination light for illuminating the target with electromagnetic illumination radiation,
at least a first and a second optical mapping unit each defining a field of view, wherein
the optical units can be used to acquire a picture,
the optical mapping units are characterized by a fix distance to one another, defining a first basic length, and
the optical mapping units are positioned so close to the first illumination light, that both optical mapping units are within the cross-section of the illumination radiation bundle reflected by the target,
at least one position-sensitive detector,
an optical axis, with the optical axis being offset regarding the measurement axis, and
a control and evaluating unit with seeking functionality for finding the target depending on a first and a second light spot so that the measurement radiation can be directed towards the target based on finding the target,
with, when executing the seeking functionality,
one part of illumination radiation of the first illumination light reflected by the target being acquired by the first optical mapping unit as a first light spot and by the second optical mapping unit as a second light spot in the picture,
at least one picture position being determined depending on the first and/or second light spot on the detector,
a parallax correction information being determined by picture processing the picture taken, where a separation of the light spots is taken into account and that depends on a distance of the two light spots to one another, and
the process of finding the target being performed using the at least one picture position and depending on the parallax correction information, so that a parallax defined by the measurement axis and the optical axis of the target-seeking unit is taken into account.

8. The laser tracker according to claim 7, wherein:
the target-seeking unit is equipped with at least a third and a fourth optical mapping unit each defining a field of view with a basic length differing from the first basic length, used instead of the first and the second optical mapping unit or additionally to these units for acquiring illumination radiation reflected by the target, with, when the seeking functionality is executed, a selection of the optical mapping units to be used being performed depending on a known nature of the target.

9. The laser tracker according to claim 7, wherein:
the laser tracker includes a calibration functionality that, when executed, determines and stores a referenced assignment of picture positions and parallax correction information to roughly approximated positions of the target and/or determines the known position of the optical axes of the optical mapping units relative to the first illumination light and/or measurement axis and/or the fix basic length of the optical mapping units and/or the known position of the optical axis of the target-seeking unit relative to the measurement axis, with, when executing the calibration functionality,
the fine distance measurement unit targeting and measuring a target provided in different positions with the help of the measurement radiation,
the at least one picture position being determined for every position of the target, and
the relative positions of the target-seeking unit regarding the measurement axis and the basic length being determined based on the measurement of the target and the at least one picture position and parallax correction information determined in this regard.

10. The laser tracker according to claim 7, wherein:
an overlap of illumination radiation cross-sectional forms of the first illumination light acquired within a picture impairing a separate picture position determination depending on the respective light spot is avoided or resolved by
the acquisition of an individual light spot position, when executing the seeking functionality, by the optical mapping units being performed in a staggered manner,
the first illumination light being capable of emitting illumination radiation of a different wavelength and/or polarization separable by the optical mapping units), with the help of filters,
segmenting the individual cross-sectional forms through picture processing the picture, using edge detection, segmenting circular shapes, circular shapes with a defined diameter or diameter interval, specifically using Circular Hough Transformation (CHT) or scale-invariant kernel operators, and/or
matching the light spot form created by the overlapping individual illumination radiation cross-sectional forms acquired in the picture with a stored sample based on a best-fit method, with sub-pixel accuracy, with the harmonized position of the sample in the picture being used to determine the respective individual light spot position of the first and the second light spot acquired in the picture, with sub-pixel accuracy, with at least one pieces of information being co-stored for the stored sample that permit to derive sample-internally defined sample positions to be used for finally determining the picture position within the sample, specifically with the information being the sample-internally defined sample position or a defined sample position determination algorithm.

11. The laser tracker according to claim 7, wherein:
the control and evaluating unit includes a picture position determination functionality that, when executed, determines a picture position in a picture acquired by an optical mapping unit with the help of picture processing in such a way that the picture position represents a position in the picture of an illumination radiation cross-sectional form acquired in the picture,
with the help of center of gravity calculation based on the light spot form acquired in the picture, with the help of a brightness and/or contrast analysis, and/or
by matching the illumination radiation cross-sectional form acquired in the picture with a stored sample based on a best-fit method, with sub-pixel accuracy, with at least one picture position of the illumination radiation acquired in the picture being determined on the basis of the harmonized position of the sample in the picture, with sub-pixel accuracy, with one piece of information being co-stored for the stored sample that permits to derive sample-internally defined sample positions to be used for finally determining the picture position within the sample, specifically with the information being the sample-internally defined sample position or a defined sample position determination algorithm, such as a sample center of gravity determination algorithm, for instance.

12. The laser tracker according to claim 7, wherein:
the control and evaluating unit is configured in such a way that, when executing the seeking functionality, an azimuth angle-related deviation of the direction of the measurement axis from the direction to the target is determined using the at least one picture position and depending on the parallax correction information, with
a roughly approximated distance to the target being determined, based on a stored referenced assignment of parallax correction information to roughly approximated distances and/or
at least one direction being derived and a roughly approximated position of the target being determined depending on the target direction, using a determined roughly approximated distance, with the help of triangulation, or
a roughly approximated position of the target being determined on the basis of a stored referenced assignment of picture positions and parallax correction information to roughly approximated positions.

13. The laser tracker according to claim 7, wherein:
the beam deflecting unit can be controlled using the control and evaluating unit in such a way that an automatic orientation of the measurement radiation is performed on the basis of the search result so that measurement radiation hits the target and can be detected using the fine targeting detector.

14. The laser tracker according to claim 7, wherein:
the parallax correction information is determined by processing the picture taken in such a way that
a distance of two picture positions on the detector is determined, which are determined on the basis of a separate picture position determination depending on the first and the second light spot in each case,
by matching the illumination radiation cross-sectional form acquired in the picture with a stored sample based on a best-fit method, with sub-pixel accuracy, with a piece of size information regarding the illumination radiation cross-sectional form acquired in the picture being determined on the basis of the harmonized form of the sample in the picture, with sub-pixel accuracy, with a piece of information being co-stored for the stored sample that permits to derive a sample-internally defined piece of information regarding the extent of light spot separation to be used for the final determination of the parallax correction information, specifically with the information being the sample-internally defined parallax correction information or a defined parallax correction information determination algorithm, or
a geometrical characteristic variable is determined for the illumination radiation cross-sectional form acquired in the picture.

15. The laser tracker according to claim 7, wherein:
the laser tracker is equipped with
a support pivoting around the vertical axis relative to the base in a motorized manner and defining the tilt axis and
a targeting unit designed as a beam deflecting unit, pivoting around the tilt axis relative to the support in a motorized manner, with a telescopic unit for emitting the measurement radiation and for receiving at least a part of the measurement radiation reflected by the target.

16. A method for finding a target with the help of a laser tracker according to claim 1, with the laser tracker being equipped with:
a base defining a vertical axis and
a beam deflecting unit for emitting a measurement radiation and for receiving at least a part of the measurement radiation reflected by the target, with
the beam deflecting unit pivoting around the vertical axis and a tilt axis relative to the base in a motorized manner and
a measurement axis being defined by an emission direction of the measurement radiation, and
a position-sensitive fine targeting detector defining a fine targeting field of view for fine targeting and tracking the target by detecting the measurement radiation reflected by the target,
as well as with
an illumination of the target with electromagnetic illumination radiation by at least a first and a second illumination light, wherein a fix distance to one another defining a first basic length,
a position-sensitive acquisition of at least one picture with a camera positioned at the laser tracker and defining a field of view, with, in the picture, at least a part of the illumination radiation of the first and the second illumination lights reflected by the target being acquired as a first and a second light spot,
a process of finding the target on the basis of analyzing the acquired light spots and orienting the measurement radiation towards the target based on finding the target, wherein:
a determination of at least one picture position on the detector of the camera depending on the first and/or the second light spot,
a determination of a piece of parallax correction information by picture processing the picture taken, within the framework of which a separation of the light spots is taken into account and that depends on a distance of the two light spots to one another,
finding the target using the at least one picture position and depending on the parallax correction information so that a parallax defined by the measurement axis and the optical axis of the camera is taken into account.

17. A method for finding a target using a laser tracker according to claim 7, with the laser tracker being equipped with:
a base defining a vertical axis and
a beam deflecting unit for emitting a measurement radiation and for receiving at least a part of the measurement radiation reflected by the target, with
the beam deflecting unit pivoting around the vertical axis and a tilt axis relative to the base in a motorized manner and
a measurement axis being defined by the emission direction of the measurement radiation, and
a position-sensitive fine targeting detector defining a fine targeting field of view for fine targeting and tracking the target by detecting the measurement radiation reflected by the target,
as well as with
an illumination of the target with electromagnetic illumination radiation by at least a first illumination light, wherein:

a position-sensitive acquisition of at least one picture with a first and a second optical mapping unit positioned at the laser tracker and each defining one field of view as part of a target-seeking unit, wherein a fix distance to one another defining a first basic length, with, in the picture, at least a part of the illumination radiation of the first illumination light reflected by the target being acquired as the first light spot by the first optical mapping unit and as the second light spot by the second optical mapping unit, finding the target on the basis of analyzing the acquired light spots and orienting the measurement radiation towards the target based on finding the target, a determination of at least one picture position on the at least one detector, the optical mapping units project at least a part of the illumination radiation reflected by the target to, depending on the first and/or the second light spot, a determination of a piece of parallax correction information by picture processing the picture taken, within the framework of which a separation of the light spots is taken into account and that depends on a distance of the two light spots to one another, finding the target using the at least one picture position and depending on the parallax correction information so that a parallax defined by the measurement axis and the optical axis of the target-seeking unit is taken into account.

18. The method according to claim 16, wherein:

determining a, particularly azimuth angle-related, deviation between the direction of the measurement axis and the direction to the target using the at least one picture position and depending on the parallax correction information, with determining a roughly approximated distance to the target, based on a stored referenced assignment of a piece of parallax correction information to roughly approximated distances and/or deriving at least one, particularly a first and a second, target direction to the target and, depending on the target directions, determining a roughly approximated position of the target, using a determined roughly approximated distance, with the help of triangulation, or determining a roughly approximated position of the target on the basis of a stored reference table, where picture positions and parallax correction information are assigned to roughly approximated positions of the target.

19. The method according to claim 16, wherein:

an automatic orientation of the beam deflecting unit on the basis of the search result, depending on a roughly approximated position of the target determined in so doing so that the measurement radiation hits the target and can be detected with the help of the fine targeting detector.

20. The method according to claim 16, wherein:

a piece of parallax correction information is determined by picture processing the picture taken in such a way that a distance of two picture positions on the detector is determined, which is determined based on a separate picture position determination depending on the first and the second light spot in each case, by means of matching the illumination radiation cross-sectional form acquired in the picture with a stored sample based on a best-fit method, with sub-pixel accuracy, a piece of size information regarding the illumination radiation cross-sectional form acquired in the picture is determined based on the harmonized form of the sample in the picture, with sub-pixel accuracy, with a piece of information being co-stored for the stored sample that permits to derive a sample-internally defined piece of information regarding the extent of the light spot separation to be used for finally determining the parallax correction information, specifically with the information being the sample-internally defined parallax correction information or a defined parallax correction information determination algorithm, or 73 sectional form acquired in the picture, and/or a process of finding the target is performed using several first and second light spots, by averaging using a roughly approximated distance to the target and/or roughly approximated position of the target determined depending on the above in each case, and/or additionally or alternatively to illuminating the target by the first and the second illumination lights, illumination by a third and a fourth illumination light with a basic length differing from the first basic length.

21. A non-transitory computer program product with program code stored on a machine-parsable medium for controlling and implementing the method, respectively, according to claim 16.

22. A laser tracker for continuously tracking a reflective target and for determining the position of the target with a base defining a vertical axis, a beam deflecting unit for emitting a measurement radiation and for receiving at least a part of the measurement radiation reflected by the target, with the beam deflecting unit pivoting around the vertical axis and a tilt axis relative to the base in a motorized manner and a measurement axis being defined by an emission direction of the measurement radiation, a position-sensitive fine targeting detector defining a fine targeting field of view for fine targeting and tracking the target by detecting the measurement radiation reflected by the target, a fine distance measurement unit for precise distance determination to the target with the help of the measurement radiation, an angle measurement functionality for determining an orientation of the beam deflecting unit relative to the base, and a target-seeking unit with an illumination light for illuminating the target with electromagnetic illumination radiation, a camera defining a field of view with a position-sensitive detector, with the camera, regarding its optical axis, being offset to the measurement axis, the camera being used in order to acquire a picture, the picture being used in order to determine a picture position $\overline{X}$ using the illumination radiation reflected by the target, and a control and evaluating unit including a seeking functionality for finding the target, configured in such a way that, when executing the seeking functionality, the process of finding the target depends on the picture position so that the measurement radiation can be directed towards the target on the basis of finding the target, wherein:

the target-seeking unit is equipped with an omnidirectional means for target distance determination for sending and receiving a measurement signal that can be used to determine a roughly approximated distance to the target by capturing a time of flight, phase information, and/or strength of the measurement signal, when executing the seeking functionality, and
the process of finding the target is performed depending on the picture position $\overline{X}$ using the determined roughly approximated distance so that a parallax defined by the measurement axis and the optical axis of the camera is taken into account.

* * * * *